(12) United States Patent
Singh

(10) Patent No.: US 12,058,217 B2
(45) Date of Patent: Aug. 6, 2024

(54) SYSTEMS AND METHODS FOR RECOMMENDING INTERACTIVE SESSIONS BASED ON SOCIAL INCLUSIVITY

(71) Applicant: Rovi Guides, Inc., San Jose, CA (US)

(72) Inventor: Mona Singh, Cary, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/086,011

(22) Filed: Dec. 21, 2022

(65) Prior Publication Data

US 2024/0214454 A1 Jun. 27, 2024

(51) Int. Cl.
*H04L 67/131* (2022.01)
*G06F 3/01* (2006.01)
*H04L 65/401* (2022.01)

(52) U.S. Cl.
CPC ............ *H04L 67/131* (2022.05); *G06F 3/011* (2013.01); *H04L 65/401* (2022.05)

(58) Field of Classification Search
CPC ....... H04L 67/131; H04L 65/401; G06F 3/011
See application file for complete search history.

(56) References Cited

U.S. PATENT DOCUMENTS

| | | | |
|---|---|---|---|
| 11,133,005 B2 | 9/2021 | Aher et al. | |
| 11,336,704 B1* | 5/2022 | Pieper | H04L 65/4015 |
| 2009/0222519 A1* | 9/2009 | Boyd | G06Q 10/109 |
| | | | 709/204 |
| 2015/0193819 A1* | 7/2015 | Chang | G06Q 30/0252 |
| | | | 705/7.19 |
| 2019/0342107 A1* | 11/2019 | Vogel | H04L 12/1822 |
| 2020/0234251 A1* | 7/2020 | Ma | H04L 9/3247 |
| 2022/0014571 A1* | 1/2022 | Polish | H04L 65/1093 |
| 2022/0327494 A1* | 10/2022 | Deole | H04L 12/1818 |
| 2022/0407731 A1* | 12/2022 | Jenkins | H04L 12/1827 |

OTHER PUBLICATIONS

Maloney et al., "Talking without A Voice" : Understanding Non-Verbal Communication in Social Virtual Reality, Proceedings of the ACM on Human-Computer Interaction, vol. 4, No. CSCW2, Article 175. Publication date: Oct. 2020 (25 pages).

(Continued)

*Primary Examiner* — Raqiul A Choudhury
(74) *Attorney, Agent, or Firm* — Haley Guiliano LLP

(57) ABSTRACT

Systems and methods are described for identifying a plurality of candidate interactive sessions for a user with a user profile to join, each candidate interactive session being associated with a plurality of user profiles. A digital representation of the user may be generated, and the digital representation of the user may be caused to join each of the plurality of candidate interactive sessions. The systems and methods may monitor, in each candidate interactive session, behavior of digital representations of each of the plurality of user profiles associated with the candidate interactive session in relation to the digital representation of the user. The systems and methods may generate, based on the monitoring, a social inclusivity score for each of the plurality of candidate interactive sessions. A recommended interactive session may be selected and provided based on the corresponding social inclusivity score for each candidate interactive session.

18 Claims, 15 Drawing Sheets

(56) References Cited

OTHER PUBLICATIONS

Mol et al., "(Not) alone in the world: Cheating in the presence of a virtual observer," Experimental Economics, 23:961-978 (2020).
Singh et al., "Augmented Reality Interfaces," IEEE Internet Computing, 17(6):66-70 (2013).
Wu et al., "Using a Fully Expressive Avatar to Collaborate in Virtual Reality: Evaluation of Task Performance, Presence, and Attraction," Frontiers in Virtual Reality (Apr. 7, 2021) (15 pages).

* cited by examiner

FIG. 1C

SYSTEMS AND METHODS FOR RECOMMENDING INTERACTIVE SESSIONS BASED ON SOCIAL INCLUSIVITY

BACKGROUND

This disclosure is directed to systems and methods for recommending an interactive session to a user based on social inclusivity. In particular, techniques are disclosed for selecting a recommended interactive session from a plurality of candidate interactive sessions, based on a corresponding social inclusivity score for each of the plurality of candidate interactive sessions.

SUMMARY

Advancements in communication technology have allowed users to attend virtual meetings with colleagues, family, and friends located in different physical locations than the users, as well as virtually meet new friends, colleagues, classmates, and others with whom they might not be very familiar. For example, conferencing systems (e.g., Microsoft® Teams, Skype®, Zoom™, etc.) may be used to host online video meetings, with parties joining virtually from around the world for work, school, and/or recreation. Such video meetings enable colleagues in separate, geographically distributed physical locations to have a collaborative face-to-face conversation via a video conference, even if one or more of such users are on the go (e.g., utilizing a smartphone or a tablet). In addition, advancements in media technology have led to development of extended reality (XR) technologies, such as virtual reality (VR), augmented reality (AR) and mixed reality (MR) technologies. In virtual meetings using video conferencing and/or XR, not all meetings include parties and/or conversations that are welcoming and inclusive, e.g., especially for a user only recently virtually encountering a person for a first time. For instance, a warning for when meeting attendees are behaving in an unfriendly way and/or impolitely would help. There exists a need to provide meeting inclusiveness information for a virtual meeting session and recommend sessions with attendees who behave more inclusively.

Generally, VR systems may fully immerse a user (e.g., giving the user a sense of being in an environment) or partially immerse a user (e.g., giving the user the sense of looking at an environment) in a three-dimensional (3D), computer-generated environment. AR systems may provide a modified version of reality, such as enhanced information overlaid over a view of real-world objects. MR systems map interactive virtual objects to the real world. Such systems may utilize wearables, such as a head-mounted device comprising a stereoscopic display, or smart glasses.

Many companies or other organizations recognize that collaboration between individuals and across teams helps achieve positive outcomes, and thus networking events or other meetings to build cooperation or camaraderie may be organized among colleagues or members of the organization. Recently, there has been an explosion of conference-call activity, especially during the Covid-19 pandemic, when a massive number of individuals worked remotely and had the need to connect with their colleagues over a network-based video session. Many users have become accustomed to working remotely (e.g., from their home), and thus many of the aforementioned networking events or other events have occurred or will occur online, e.g., in a video conference or in an XR environment.

It is often the case that a user has multiple options at a particular time as to which video session or which XR session he or she is able to join. For instance, a user may have multiple simultaneous virtual meetings on his or her schedule, a user might be invited to multiple breakout group sessions within a larger virtual meeting, and/or a user could have a plethora of meetings available via public and/or private chatrooms, social media platforms, VR platforms, games, and more. Selecting a meeting, from a plurality of meetings, is not a simple task, especially without knowing more information about the attendees and how they might handle new attendees. A new employee may be invited to several department meetings. A social media user might be looking for a new group, conversation, or chatroom to discuss sports, cinema, or politics. A gamer may have dozens of cooperative sessions, with unknown users, from which to choose.

In one approach, a user may be invited to multiple sessions, and each invite may include an agenda and/or other users also invited to the session. However, in such an approach, video conferencing platforms and XR platforms generally fail to provide adequate insights with respect to in which video session or which XR session a user is most likely to be welcomed by (e.g., have positive interactions with) the other participants, particularly if the user is not familiar with the other participants. Moreover, even if a breakout room is created from within a video meeting, such breakout room is generally created without providing a user with adequate information as to whether he or she is likely to feel welcomed in the breakout room. In the absence of adequate information to discern the social inclusivity in relation the user in a particular session, a user often will only join a session where he or she is friends with the other participants, thereby missing out on opportunities to form new relationships. In some cases, the user might be stuck in a session in which he or she is ignored by other attendees and/or a meeting in which he or she is not engaged, which becomes an unnecessary drain on his or her time, and a missed opportunity in the sense that the user may be missing out on another more engaging session occurring at the same time, which may be detrimental to both the user and the user's organization.

To help overcome these problems, systems and methods are provided herein for identifying a plurality of candidate interactive sessions for a user with a user profile to join, wherein each candidate interactive session is associated with a plurality of user profiles, and generating a digital representation of the user. The systems and methods provided herein may cause the digital representation of the user to join each of the plurality of candidate interactive sessions, and monitor, in each candidate interactive session, behavior of digital representations of each of the plurality of user profiles associated with the candidate interactive session in relation to the digital representation of the user. The systems and methods provided herein may generate, based on the monitoring of the behavior of the digital representations of each of the plurality of user profiles respectively associated with the plurality of candidate interactive sessions, a social inclusivity score for each of the plurality of candidate interactive sessions. The systems and methods provided herein may select the recommended interactive session, from the plurality of candidate interactive sessions, based on the corresponding social inclusivity score for each of the plurality of candidate interactive sessions, and provide the recommended interactive session.

Such aspects may enable providing a particular user with insight as to which interactive session of multiple candidate interaction sessions is optimal from a social inclusivity standpoint (e.g., interactions between individuals at a personal level during the interactive session, such as, for example, related to social engagement, social participation, and social acceptance in relation to the particular user). The systems and methods provided herein may be implemented to enable computational modeling of social engagement, participation, or acceptance. In some embodiments, the systems and methods provided herein may be applied in the context of video communication sessions, e.g., by augmenting video communication tools with a social inclusivity feature whereby participants and groups may be continually assigned a social inclusivity score in relation to the user based on their behavior during interactive sessions with the user. In some embodiments, the systems and methods provided herein may be applied in the context of XR sessions, such as, for example, VR sessions or AR sessions, whereby participants and groups may be continually assigned a social inclusivity score in relation to the user based on their behavior during interactive sessions with the user. In some embodiments, a digital representation (e.g., avatar) of the user may be sent to separate interactive sessions, to observe and gather information used to generate the social inclusivity scores.

In some embodiments, the plurality of candidate interactive sessions may correspond to a plurality of video communication sessions or virtual meetings. In some embodiments, the plurality of candidate interactive sessions may correspond to a plurality of virtual reality sessions, virtual reality meetings, or virtual reality games.

In some aspects, the digital representation of the user comprises a sentient avatar. The systems and methods provided herein may be configured to receive input to join the user profile to the recommended interactive session, and cause an active avatar of the user profile to be joined to the recommended candidate interactive session. In some embodiments, an appearance of the sentient avatar is different from an appearance of the active avatar. In some embodiments, the sentient avatar has limited interactive capabilities in relation to the digital representations of each of the plurality of user profiles, as compared to the active avatar.

In some embodiments, the systems and methods provided herein may generate for display one or more social inclusivity scores for one or more of the plurality of user profiles associated with a particular candidate interactive session, based on the monitoring of the behavior of the digital representations of each of the plurality of user profiles respectively associated with the plurality of candidate interactive sessions.

In some aspects of this disclosure, the monitoring comprises monitoring one or more of audio, body posture, body language, gestures or actions performed by the digital representations of each of the plurality of user profiles associated with the candidate interactive session in relation to the digital representation of the user.

In some embodiments, the systems and methods provided herein may determine historical patterns of behavior of each of the plurality of user profiles in relation to the user profile during previous interactive sessions. In some embodiments, providing the recommended interactive session may be performed based at least in part on the determined historical patterns.

In some aspects of this disclosure, the systems and methods provided herein may determine one or more characteristics of the user based on the user profile. In some embodiments, providing the recommended interactive session may be performed based at least in part on the determined one or more characteristics. For example, within an organization, the systems and methods provided herein may be configured to recommend a user to invite to an interactive session, or recommend an interactive session associated with a user having a job title or job function that the user may need to interact with who is more welcoming to the user than others of that job function. Such features can help form a relationship with the user that is beneficial to the organization.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

FIGS. 1A-1C depict illustrative user interfaces for recommending an interactive session based on a social inclusivity score, in accordance with some embodiments of this disclosure.

DETAILED DESCRIPTION

Figure 1A:
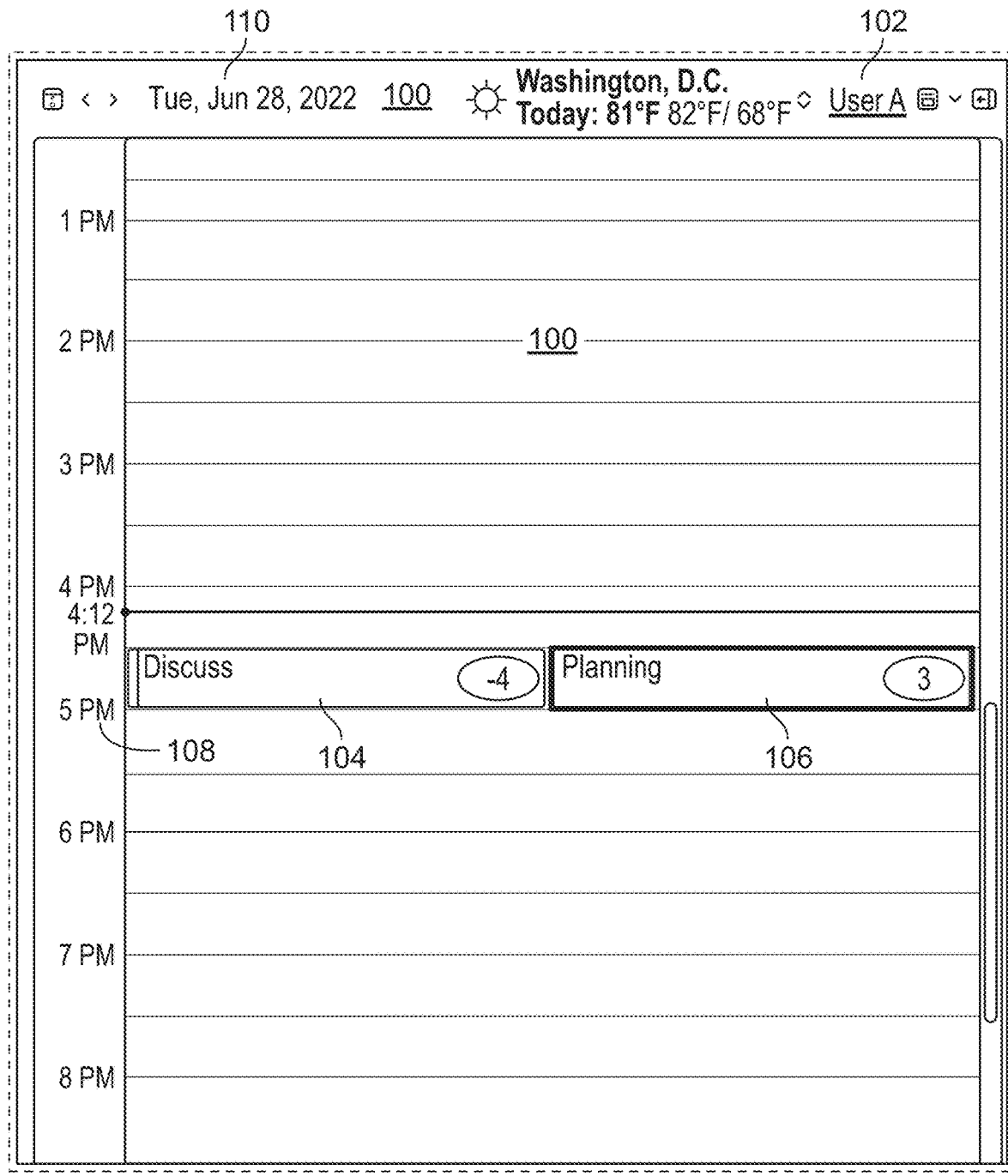
Figure 1B:
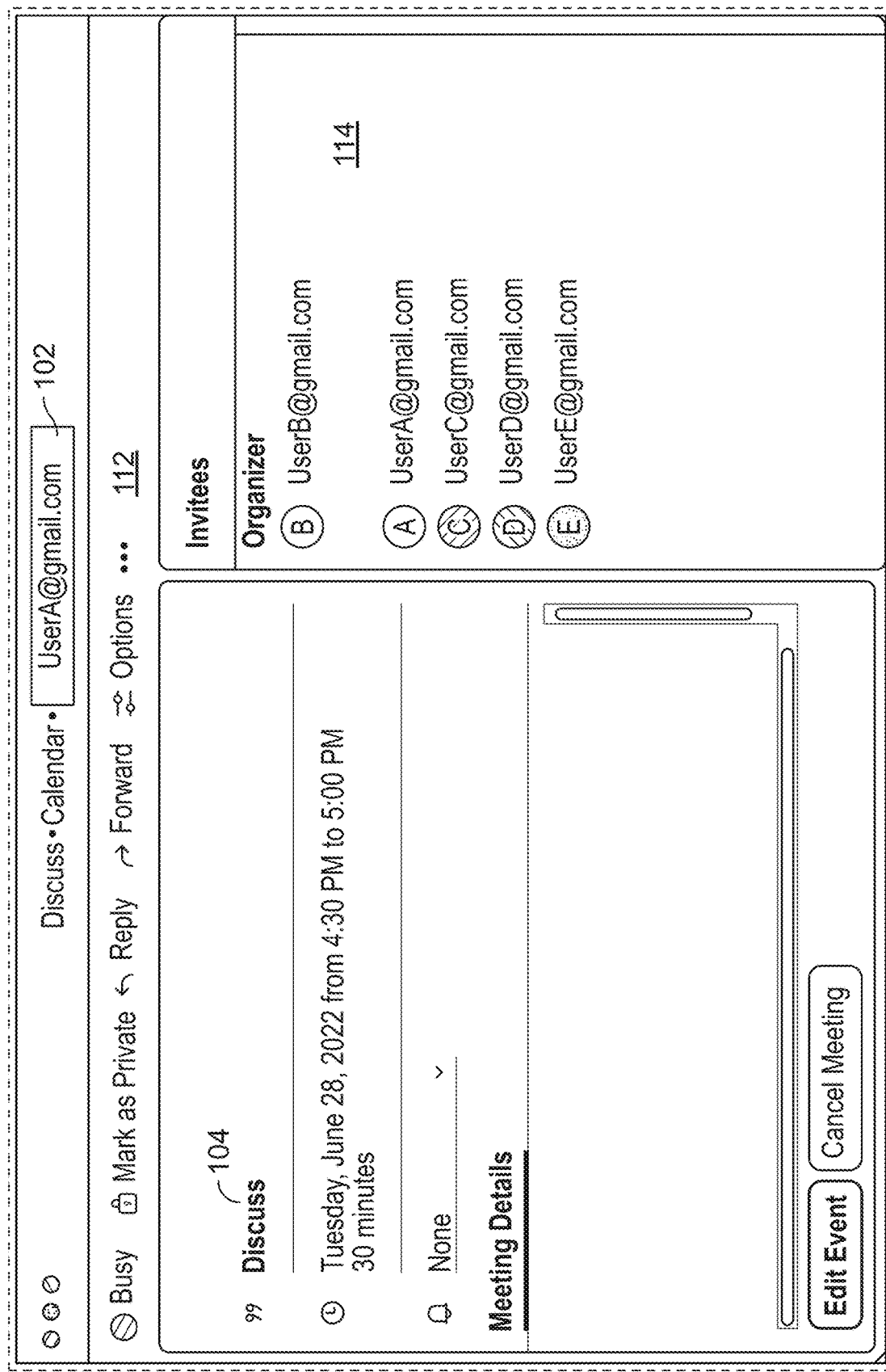
Figure 1C:
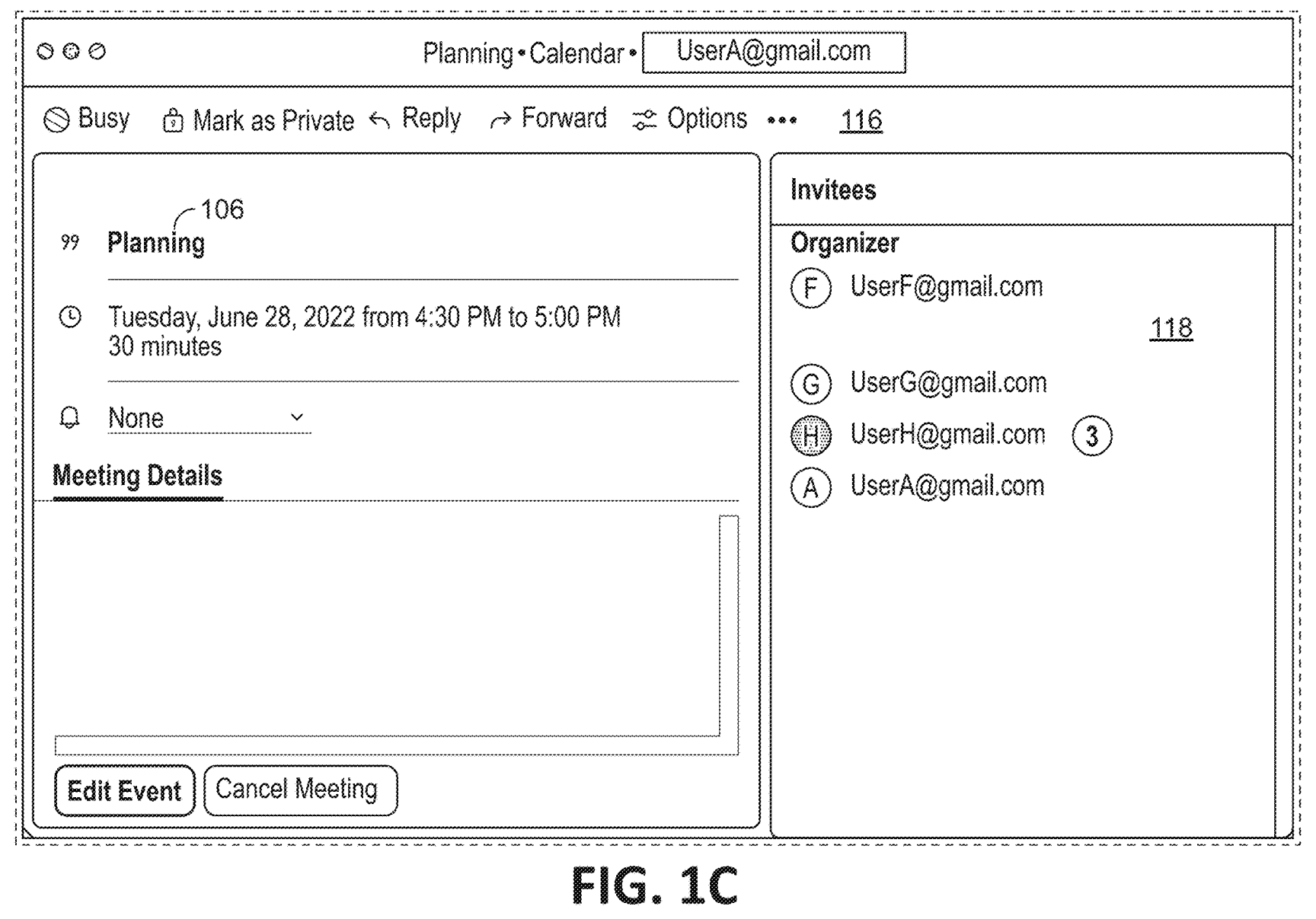

FIGS. 1A-1C depict illustrative user interfaces for recommending an interactive session based on a social inclusivity score, in accordance with some embodiments of this disclosure. In the example of FIG. 1A, user interface 100 may be provided at least in part by a social inclusivity monitoring application. The social inclusivity monitoring application may be executing at least in part at a device (e.g., device 201 of FIG. 2A) associated with a user (e.g., User A specified at 102) and/or at one or more remote servers and/or at other computing devices. The social inclusivity monitoring application may correspond to or be included as part of the social inclusivity monitoring system (SIMS), which may be configured to perform the functionalities described herein. In some embodiments, the SIMS may comprise the social inclusivity monitoring application, one or more XR applications, one or more video communication applications, one or more social networking applications, any suitable number of displays, sensors or devices such as those described in FIGS. 1-7, or any other suitable software and/or hardware components, or any combination thereof.

In some embodiments, the social inclusivity monitoring application may be installed at or otherwise provided to a particular device (e.g., device 201 of FIG. 2A), may be provided via an application programming interface (API), or may be provided as an add-on application to another platform or application (e.g., an XR application, a video game platform, a video communication application, an email platform, or any other suitable platform or application any combination thereof). In some embodiments, software tools (e.g., one or more software development kits, or SDKs) may be provided to any suitable party, to enable the party to implement the functionalities as discussed herein.

As shown in the example of FIG. 1A, user interface 100 presented to User A specified at 102 may include indications of a plurality of candidate interactive sessions 104 and 106 that User A is invited to or otherwise is permitted to access or join. As shown in the example of FIG. 1A, each of interactive sessions 104 and 106 is scheduled for the same time period 108 (e.g., 5 PM) on a particular day 110 (e.g., Tuesday Jun. 28, 2022). The SIMS may facilitate the interactive session, which may be a computer-generated or digital interactive session, such as, for example, a video communication session, a virtual meeting, a video call or video conference, an XR session, an XR meeting, an XR game, a multi-player video game, a watch party of a media asset, or any other suitable interactive session, or any combination thereof, as between any suitable number of users. For example, the SIMS may be configured to establish the interactive session over a network (e.g., network 7 of FIG. 7) with one or more devices of one or more other users (e.g., each of User A, User B, User C and User D shown in FIG. 2A-2B). In some embodiments, one or more devices of the one or more other users may also implement the SIMS. The interactive session may correspond to a two-dimensional (2D) or three-dimensional (3D) environment, or any other suitable environment. As referred to herein, the term "media asset" may be understood to refer to electronically consumable user assets, e.g., television programming, as well as pay-per-view programs, on-demand programs (as in video-on-demand (VOD) systems), internet content (e.g., streaming content, downloadable content, webcasts, etc.), XR content, video clips, audio, playlists, websites, articles, electronic books, blogs, social media, applications, games, and/or any other media or multimedia, and/or combination of the above.

In some embodiments, the SIMS may generate, for each of the plurality of candidate interactive sessions, one or more social inclusivity scores. For example, the SIMS may generate such one or more social inclusivity scores by monitoring and analyzing behavior of other users participating in or invited to an interactive session in relation to User A, based on historical behavior of those users or other users towards User A, based on preferences of User A, or based on any other suitable criteria, or any combination thereof. An illustrative, non-limiting list of behavioral signals that may be evaluated in generating a social inclusivity score is shown at Table 1 below:

TABLE 1

| Condition | True | False |
| --- | --- | --- |
| Face toward the user | 1 | 0 |
| Eye contact with the user | 1 | 0 |

TABLE 1-continued

| Condition | True | False |
| --- | --- | --- |
| Smiling expression toward the user | 1 | 0 |
| Not responding to the user's greeting | −1 | 0 |
| Scowling expression toward the user | −1 | 0 |
| Waving toward the user | 1 | 0 |
| Welcoming words (e.g., "Hello," "Welcome") uttered towards the user | 1 | 0 |
| Pleasant tone of verbalization uttered toward the user | 1 | 0 |
| Unpleasant tone of verbalization uttered toward the user | −1 | 0 |
| Transition to open body language when the user arrives | 1 | 0 |
| Transition to closed body language when the user arrives | −1 | 0 |
| Delayed response when the user speaks, raises hand or performs gesture | −1 | 0 |
| Quick response when the user speaks, raises hand or performs gesture | 1 | 0 |
| Ignoring the user when the user speaks, raises hand or performs gesture | −1 | 0 |
| Muting the user | −1 | 0 |
| Talking over or interrupting the user | −1 | 0 |
| Crowding out or attempting to exclude user from physical area of users | −1 | 0 |

For example, behavioral signals of other user profile(s) (e.g., User B, User C and User D shown in region 114 of FIG. 1B) in relation to User A may be monitored during interactive session 104 or may be determined based on previous interactive sessions including such other user profile(s) and User A. In some embodiments, such behavioral signals of other user profile(s) may correspond to detected body posture, verbalizations, and/or explicit actions performed in relation to User A in an interactive session. In some embodiments, such as, for example, as shown in Table 1 above, the SIMS may determine whether the behavior towards User A is a positive or negative interaction from the perspective of User A, which may be determined based on sentiment analysis and/or any other suitable technique, as discussed in further detail below. If the SIMS determines that certain behavior of other user profiles is a positive action in relation to User A, the social inclusivity score for the interactive session may be given a positive score or weight, e.g., incremented +1, or any other suitable value, which may be performed by using a counter. On the other hand, if the SIMS determines that certain behavior is a negative action in relation to User A, the social inclusivity score for the interactive session may be give a negative score or weight, e.g., decremented by any suitable value, e.g., −1, or any other suitable value, which may be performed by using the counter. In some embodiments, "raises hand" in Table 1 may correspond to detecting User A has physically raised his or her hand, or to detecting that User A has provided input to select a "Raise Hand" option during the interactive session to signify that he or she would like to speak.

In some embodiments, certain behavior towards User A may be deemed more indicative of a positive or negative interaction than other behavior. For example, if the SIMS detects audio from a user praising all of the hard work that User A has done recently, this may result in incrementing the social inclusivity score by a higher amount than if the SIMS detects that user making eye contact with User A. As another example, if a user mutes User A when User A is trying to speak, this may result in decrementing the social inclusivity score by a higher amount than if the SIMS detects that a user having a delayed response when User A speaks, since such user may be contemplating a response rather than ignoring User A. In some embodiments, the SIMS may allow User A to specify in connection with his or her profile which behaviors should result in incrementing or decrementing a social inclusivity score, and/or a weight by which the incrementing or decrementing may occur. In some embodiments, depending on the circumstances, the non-occurrence of a signal may be assigned a score or weight of zero, and may be configured to have no impact on the social inclusivity score. In some embodiments, the number of, and/or types of, behavioral signals detected by the SIMS may depend at least in part on capabilities of the underlying platform.

An illustrative, non-limiting example of using the SIMS to recommend a candidate interactive session is described below. Table 2, shown below, specifies various behaviors toward User A and respective contributions of such behaviors towards one or more social inclusivity scores for a particular interactive session and/or participants associated therewith. For example, User A may be employed with a company and have the job title of "Business Analyst," and he or she may frequently participate in digital interactive sessions with colleagues. User A may realize that his company has recently hired a number of new employees, and that he has found interactive sessions with such new employees counterproductive. The SIMS may receive input from User A requesting that all of his future interactive sessions, or one or more particular interactive sessions, or interactive sessions associated with certain users (e.g., the new employees), associated with certain topics (e.g., gleaned from a title of the interactive session or other metadata) or occurring at certain times or places, or certain users, or any combination thereof, should be assigned a social inclusivity score. As an illustrative example, the SIMS may record the following behavior from one or more interactive sessions, associated with the users below and their behavior towards User A.

TABLE 2

| User | Behavior | Score Contribution |
|---|---|---|
| User C | Does not respond to User A's greeting (e.g., "Hello") | −1 |
| User E | Uses unpleasant tone of verbalization (e.g., "Hello") to User A | −1 |
| User E | Responds to User A's raised hand | 1 |
| User H | Uses pleasant tone of verbalization (e.g., "Hello") to User A | 1 |
| User H | Pauses to respond to User A's raised hand | 1 |
| User H | Has smiling expression when User A is speaking | 1 |
| User C | Has scowling expression when User A is speaking | −1 |
| User E | Mutes User A when User A is asking a question or is speaking | −1 |
| User C | Talks over or interrupts User A | −1 |

Table 3 shows illustrative social inclusivity scores of the users, based on the score contribution specified in Table 2, as generated by the SIMS. As an example, the SIMS may have determined that User D has been present in some previous interactive sessions with User A, and/or the current interactive session, but may have acted neutrally toward User A, resulting in a score of zero for User D in relation to User A. In some embodiments, certain users (e.g., User B, User F and User G) that the SIMS determines have not been present in any interactive session with User A may be treated as having a social inclusivity score of zero or undefined.

TABLE 3

| User | Social Inclusivity Score |
|---|---|
| User C | −3 |
| User D | 0 |
| User H | 3 |
| User E | −1 |

In some embodiments, the SIMS may aggregate the behavioral signals expressed by individual participants in the interactive session, in relation to the particular user (e.g., User A). For example, the SIMS may compute an average or a sum of the scores associated with detected behavior for one or more interactive sessions and/or for each particular participant in relation to User A over one or more interactive sessions. In some embodiments, the SIMS may assign the other user profiles (e.g., associated with User B, User C and User D) a social inclusivity score based on the user's behavior towards an active avatar or a sentient or active avatar of User A, as discussed in more detail below, to determine estimates of social inclusivity expressed by individual participants towards the user.

As shown in FIG. 1A, the SIMS may generate one or more recommendations associated with interactive sessions 104 and 106 based on the social inclusivity scores shown in Table 3. For example, based on the social inclusivity score determined for participants associated with interactive session 106 titled "Planning," interactive session 106 may be recommended to User A, which may be conveyed by interactive session 106 being highlighted with a particular color or pattern or otherwise emphasized as compared to interactive session 104 titled "Discuss." In some embodiments, a ranked list of the candidate interactive sessions may be presented to User A, or only the top-ranked interactive session may be presented. In some embodiments, the SIMS may provide any suitable alert, e.g., audio or electronic message, to any suitable device, to recommend one or more interactive sessions. In some embodiments, the social inclusivity scores for such interactive sessions may be provided to the user (e.g., "3" for interactive session 106 and "−4" for interactive session 104) to assist User A in assessing his or her choices of interactive sessions.

As shown in the example of FIG. 1B, the SIMS may generate for display, e.g., upon receiving selection of interactive session 104 from user interface 100, user interface 112. User interface 112 may comprise an indication of interactive session 104 and user profiles (and/or emails and/or other suitable information) associated with such interactive session. For example, in region 114 of user interface 112, an indication of User B as the organizer, and an indication of User A, User C, User D and User E having been invited to participate or otherwise participating in interactive session 104 may be provided. For example, the social inclusivity score of "−4" for interactive session 104 as shown in FIG. 1A may be computed by summing the social inclusivity scores of User C ("−3"), User D (zero) and User E ("−1") associated with interactive session 104, based on Table 3. User B may be an organizer of interactive session 106. In some embodiments, multiple social inclusivity scores for each interactive session, e.g., with one score generated based on social inclusivity scores of users already participating in the interactive session, and the other score generated further based on users not currently participating in the interactive session but having been invited to participate, as well as the scores of users already participating.

In some embodiments, icons or other indicia associated with each of the user profiles indicated at region 114 may reflect social inclusivity scores of such users, e.g., invitees or participants of a video communication session or XR session in an XR environment. This may improve accessibility and transparency for User A, and may be provided based on User A selecting interactive session 104 at user interface 100. As an example, an icon for a user profile may encode or represent a user's social inclusivity score relative to User A by way of a particular color, a particular pattern, an explicit indication of the social inclusivity score, or any other suitable indication, or any combination thereof. For example, since the social inclusivity score of User B in relation to User A is zero or undefined, User B may be associated with a default icon. On the other hand, since the social inclusivity score of User C in relation to User A is "−3," the icon associated with User C may include a specific pattern or color (e.g., bright orange) or other representation suggesting a low social inclusivity score, or a lowest inclusivity score or a score of −3. Since the social inclusivity score of User D in relation to User A is zero, User D may be associated with a default icon. Since the social inclusivity score of User D in relation to User E is "−1," User E may be associated with an icon of a different pattern than User C or a more subtle color (e.g., a lighter shade of orange than the bright orange used for a relatively low score of "−3" in associated with User C).

As shown in the example of FIG. 1C, region 118 of user interface 116 may include one or more explicit indications of a social inclusivity score (e.g., "3" representing the social inclusivity score for User H in relation to User A). User F may be an organizer of interactive session 106 indicated in user interface 116, and may be appear to User A with a default icon based on having a social inclusivity score of zero or undefined in relation to User A. User G may also appear to User A with a default icon based on having a social inclusivity score of zero or undefined in relation to User A. The social inclusivity score of "3" for interactive session 106 as shown in FIG. 1A may be computed by summing the social inclusivity scores of User F (zero), User G (zero) and User H (3) associated with interactive session 106, based on Table 3. Accordingly, it may be desirable for User A to join interactive session 106, given that interactive session is associated with a higher social inclusivity score than interactive session 104 that is occurring at the same time as interactive session 106. While the behaviors and social inclusivity scores are shown in the example above as being included in a table, the SIMS may employ any suitable data structure to store, update and reference such information.

In some embodiments, the SIMS may generate a social inclusivity score based at least in part on historical interactions of a particular user (e.g., User A) with other users associated with (e.g., having their digital representation present in or otherwise invited to and/or expected to join) a particular interactive session. For example, the SIMS may identify how such users behaved towards the particular user in previous interactive sessions, which may inform the social inclusivity score for such users and/or for the interactive session associated with such users. In some embodiments, a social inclusivity score may be based at least in part on one or more topics associated with an interactive session, which may be determined based on analyzing a title, an agenda or metadata for such interactive session. In some embodiments, interactions outside of a video communication session or XR session, e.g., user ratings of a particular user, analyzing audio of telephone calls, analyzing text or images of email or other electronic communications between the users, analyzing a frequency of communications or a sentiment of communications with the users, or any other suitable criteria, or any combination thereof, may factor into the determined social inclusivity scores.

In some embodiments, the SIMS may select a recommended interactive session (e.g., 106, having a higher social inclusivity score) from the plurality of candidate interactive sessions (e.g., interactive sessions 104 and 106), based on the corresponding social inclusivity score for each of the plurality of candidate interactive sessions. For example, the SIMS may select a candidate interactive session having the highest overall social inclusivity score (e.g., based on the scores of each user associated with the interactive session and/or subject matter of the interactive session) or the candidate interactive session associated with a highest social inclusivity score for a particular user. In some embodiments, the SIMS may set the social inclusivity score for a given interactive session to the average social inclusivity score for all users associated with the meeting in relation to the particular user (e.g., User A specified at 102). The SIMS may provide the recommended interactive session to the user (e.g., User A specified at 102 of FIG. 1). In some embodiments, the SIMS may display to User A (e.g., at device 201 of FIG. 2A) a ranked list of the candidate interactive sessions based on the corresponding social inclusivity scores, or otherwise display a top ranked candidate interactive session that is accentuated relative to the other candidate interactive sessions. In some embodiments, the SIMS may display the computed social inclusivity score for a particular interactive session, and/or may display the social inclusivity score for one or more users associated with the particular interactive session. In some embodiments, such social inclusivity scores may be displayed for each candidate interactive session simultaneously, or for a candidate interactive session that is selected during a scrolling operation or other operation when the user is navigating through the recommended interactive sessions.

FIGS. 2A-2D show illustrative interactive sessions, in accordance with some embodiments of this disclosure. In some embodiments, the interactive session of FIGS. 2A-2B may correspond to interactive session 104 in which User A, User B, User C and User D may be participating, and the interactive session of FIGS. 2C-2D may correspond to interactive session in which User A, User F, User G and User H may be participating. Device 201 of FIGS. 2A and 2C may be a device associated with User A, and device 203 of FIG. 2B may be a device associated with any of Users B, C or D, and device 205 of FIG. 2D may be a device associated with any of Users F, G and H. Device 201, 203 and 205 may be, for example, a mobile device such as a smartphone or tablet, a laptop, a desktop computer, a smart television, a smart watch or wearable device, smart glasses, a stereoscopic display, a wearable camera, VR glasses, VR goggles, AR glasses, an AR head-mounted display (HMD), a VR HMD or any other suitable computing device, or any combination thereof. In some embodiments, the device may include or be used in conjunction with any other suitable sensors or equipment, e.g., VR haptic gloves, to provide a realistic touch sensation, a VR remote controller, a VR baseball bat or golf club or other suitable VR item, a VR body tracker, and/or any other suitable sensor or equipment.

Figure 2A:
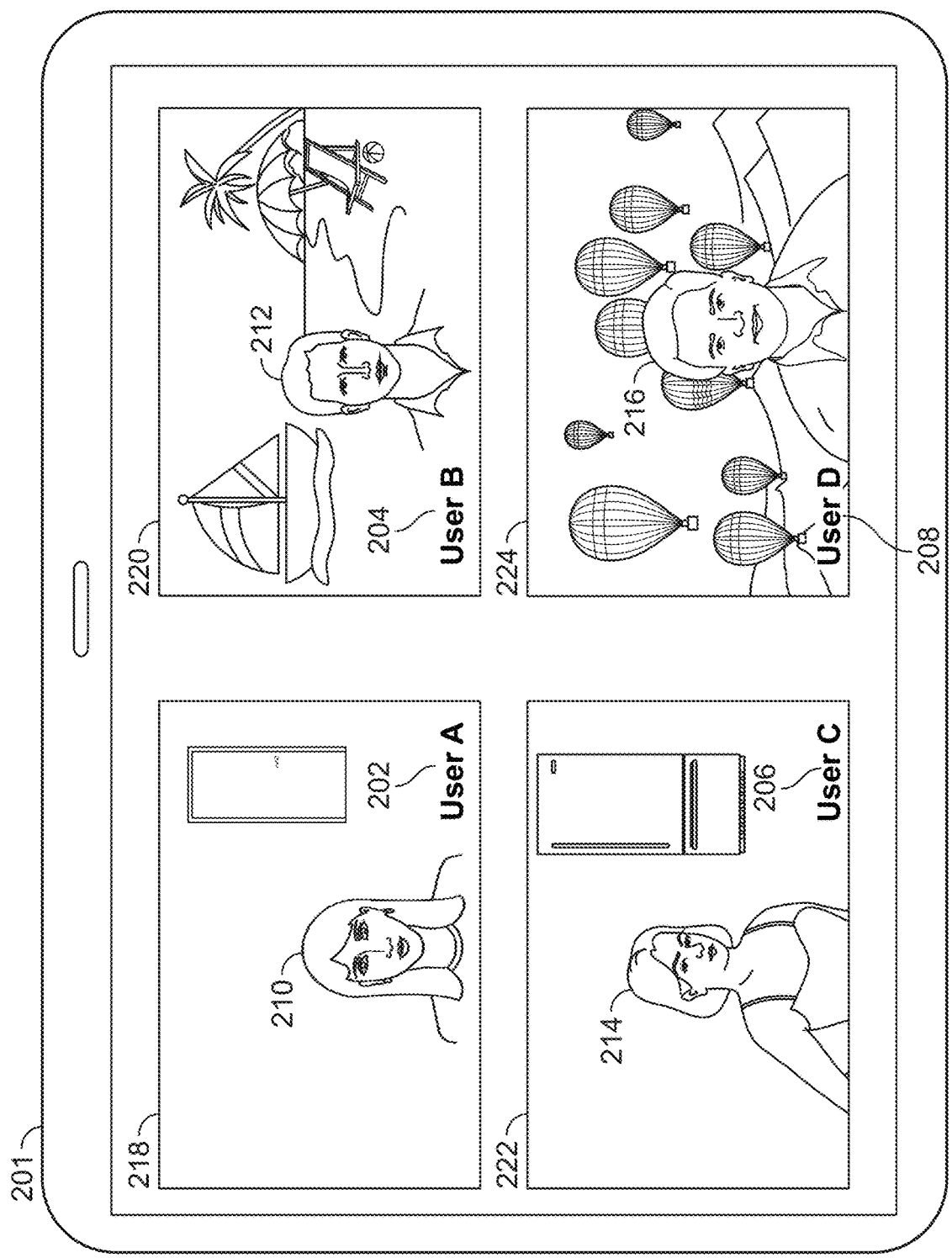
FIGS. 2A-2D depict illustrative interactive sessions, in accordance with some embodiments of this disclosure.

In the example of FIG. 2A, the interactive session may be a video conference or a virtual meeting. The SIMS may enable device 201 of User A to receive and transmit over a network (e.g., network 709 of FIG. 7) audio signals, video signals, images, textual data, emojis, and/or any other suitable data, in connection with the interactive session. For example, such audio signals may be spoken by User A and/or other audio present in the environment surrounding User A, and detected by a microphone of device 201 or may be audio detected by a microphone of a device of any other user participating in the interactive session. The images may be still images and/or video, captured by a camera of device 201 of User A (or other camera external to device 201) to depict digital representation 210 of User A and/or the environment surrounding User A. The SIMS may further enable one or more user devices associated with one or more other users (e.g., User B, User C, and User D specified at 204, 206, and 208, respectively, of FIG. 2A) to receive and transmit over a network (e.g., network 709 of FIG. 7) audio signals, video signals, images, textual data, emojis, and/or any other suitable data, in connection with the interactive session. For example, such audio signals may be spoken by User B, User C or User D and/or other audio present in the environment surrounding User B, User C or User D and detected by a microphone of a device of User B, User C or User D or may be audio detected by a microphone of any other user participating in the interactive session. The images may be still images and/or video, captured by a camera of a user device of User B, User C or User D depicting such user and/or the environment surrounding such user. In some embodiments, the SIMS may provide messaging and chat functions to allow users to interact with each other.

Figure 2B:
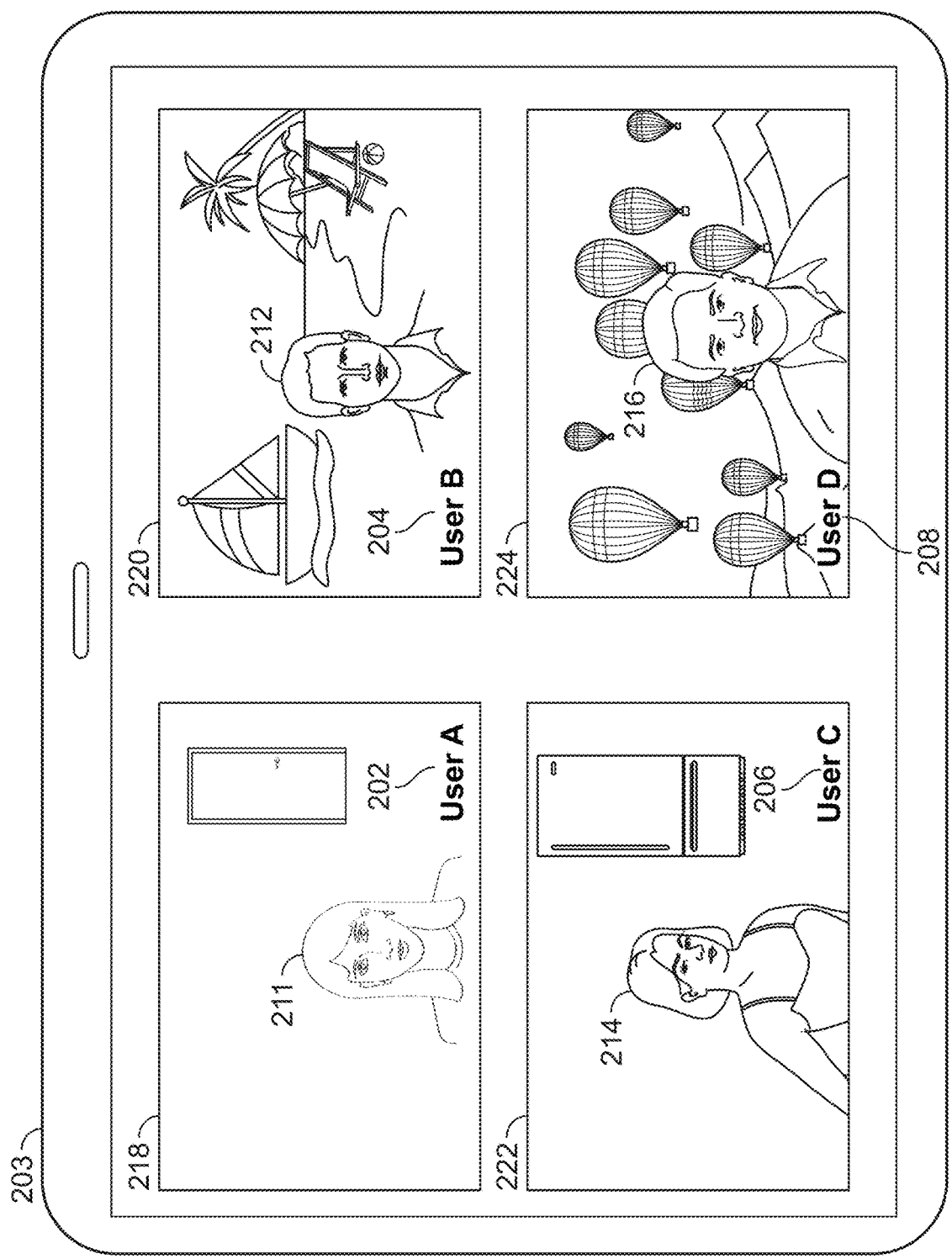
Figure 2C:
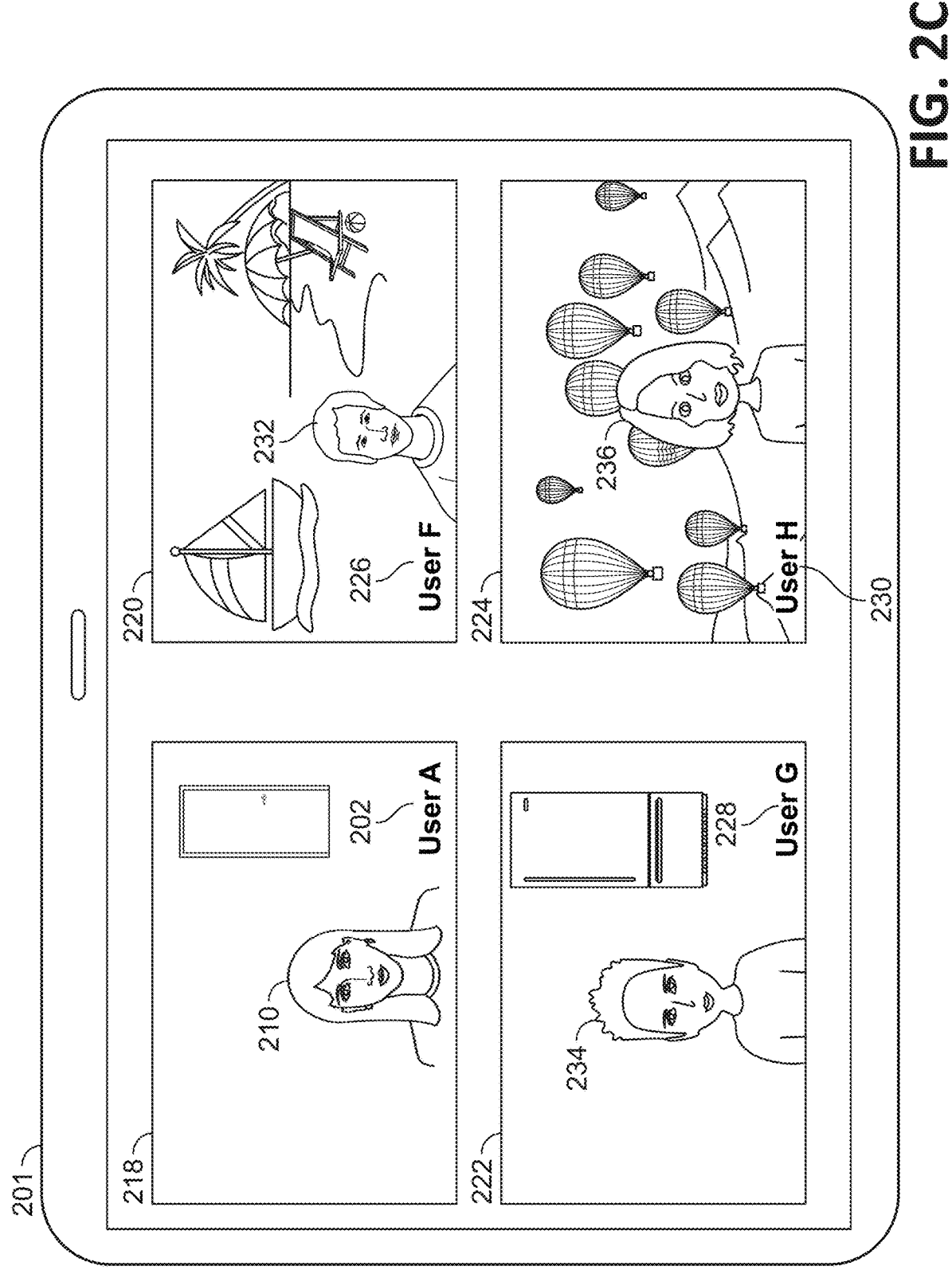
Figure 2D:
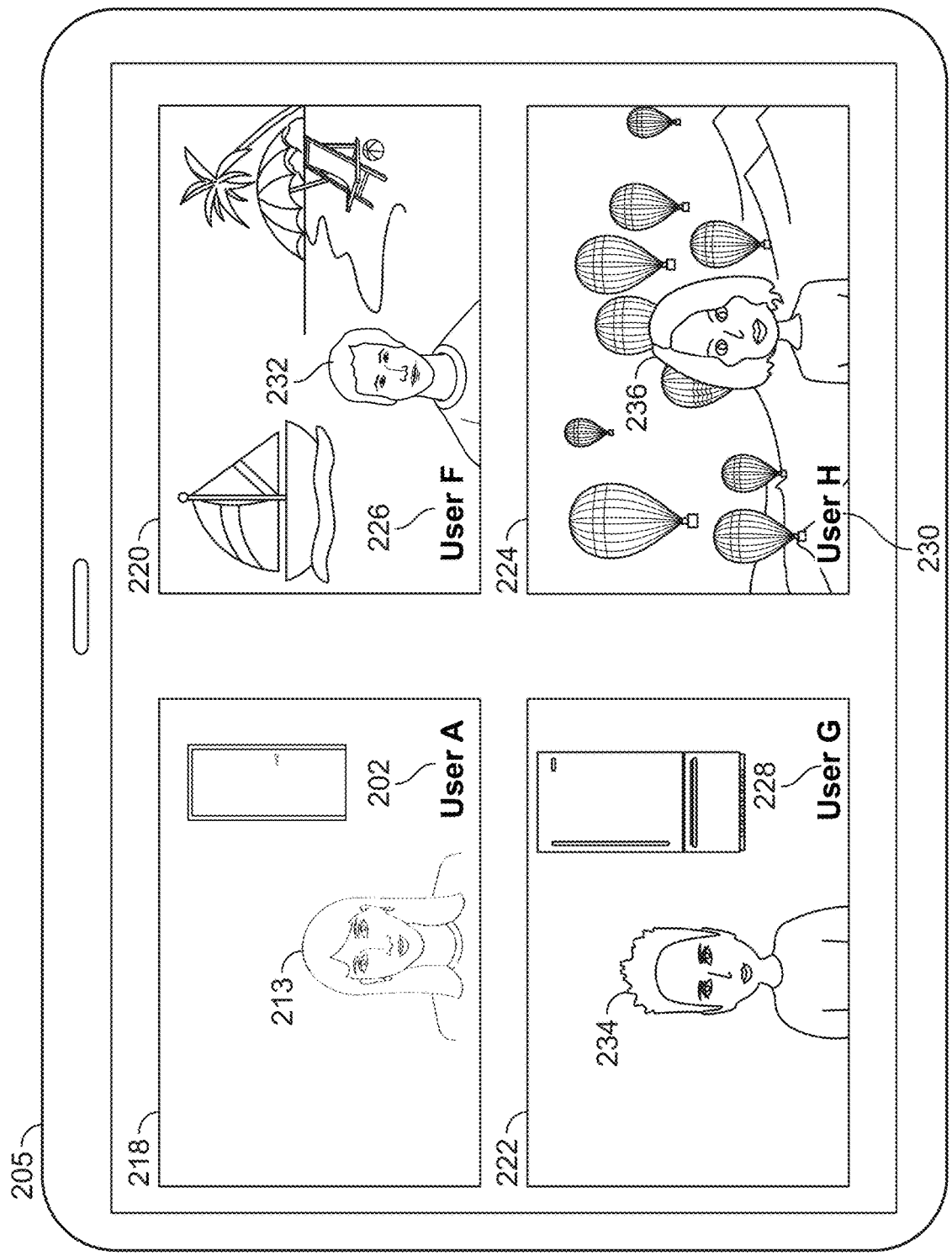

As shown in FIGS. 2A-2D, in some embodiments, the environment depicted behind a user (e.g., as seen by that user and/or any suitable number of other users during the video communication session) may generally (e.g., as a default setting) correspond to an actual physical environment (218 and 222 in FIGS. 2A-2B surrounding the user (e.g., an office building, a home office, a basement, a public setting, or any other suitable environment). In some embodiments, the SIMS may generate for display a virtual background to completely replace or partially replace the physical background of a user. For example, the SIMS may generate for display virtual background 224 corresponding to balloons in a mountainous landscape behind User D (FIGS. 2A-2B) or behind User H (FIGS. 2C-2D), or virtual background 220 corresponding to a beach setting behind User B (FIGS. 2A-2B) or User F (FIGS. 2C-2D).

Figure 7:
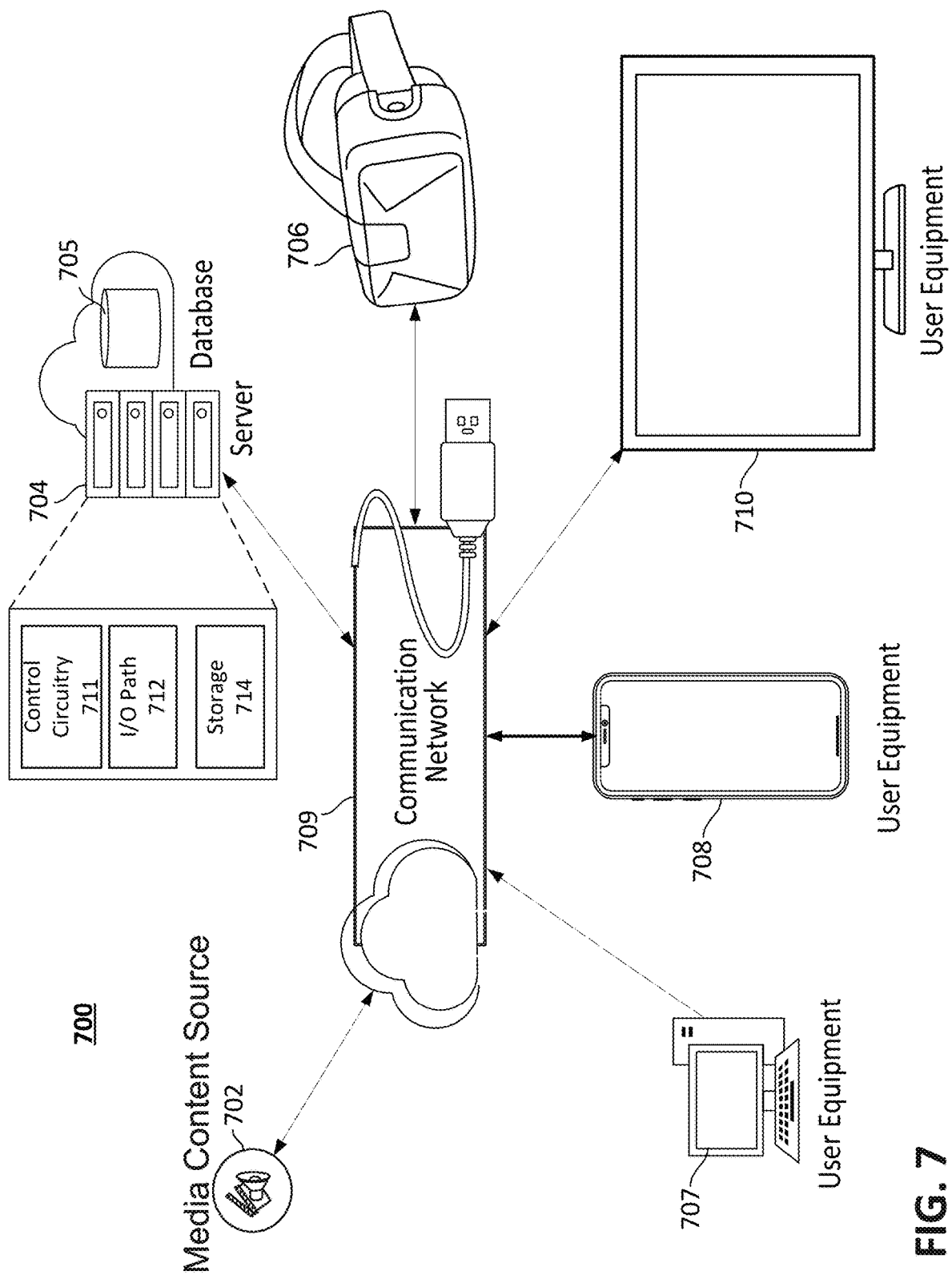

In some embodiments, the interactive session may be hosted by one or more remote servers (e.g., server 704 of FIG. 7). In some embodiments, the interactive session can be a video conference or virtual meeting or a video chat, e.g., scheduled for a particular time or spontaneously created at the request of a user, with any suitable number of participants. In some embodiments, each user may access the interactive session via a connected device (which may be equipped with or otherwise proximate to a camera and a microphone) accessing one or more of a web address or virtual room number, e.g., by entering his or her username and password. In some embodiments, one or more users may be a moderator or host, where a designated moderator may have the task of organizing the meeting and/or selecting the next participant member to speak or present. In some embodiments, the SIMS may be utilized in recording a video, which may be transmitted in real time (e.g., live-streamed) to other users. In some embodiments, the video may be recorded, stored and transmitted at a later time to other users and/or posted to any suitable website or application (e.g., a social network, video sharing website application, etc.) for consumption by other users.

In some embodiments, video data and audio data associated with the respective interactive session participants may be transmitted separately during the interactive session, along with a header or metadata (e.g., time stamps). Such header or metadata may enable synchronization of the audio and video data at the destination device, or audio and video data may be combined as a multimedia data stream. In some embodiments, any suitable audio or video compression and/or encoding techniques may be utilized. Such techniques may be employed prior to transmitting the audio and/or video components of the video communication session from a user device to a server. In some embodiments, at least a portion of such video compression and/or encoding may be performed at one or more remote servers (e.g., an edge server and/or any other suitable server). In some embodiments, the receiving or rendering user device may perform decoding of the video and/or audio data or multimedia data stream upon receipt, and/or at least a portion of the decoding may be performed remote from the receiving user device. In some embodiments, User A and User B, User C or User D may be located in the same or different geographical locations (e.g., in the same office or country or different countries), and the interactive session may be assigned a unique interactive session identifier. In the example of FIGS. 2A-2D, depictions of the users participating in the interactive session may be arranged in any suitable format (e.g., to depict a current speaker only, to depict each conference participant including the user himself or herself, a subset of the conference participants, etc.).

The SIMS may be configured to generate for display an indication of a user name (e.g., User A) associated with a user profile or user account of User A associated with the interactive application (or an account or profile of the user with another service, e.g., a social network), and a digital representation 210 of User A. In some embodiments, an indication of user names (e.g., User A, User B, User C and User D) associated with user profiles or user accounts of other users specified at 202, 204, 206 and 208, respectively, of FIGS. 2A-2B may be generated for display. In some embodiments, an indication of usernames (e.g., User A, User F, User G and User H) associated with user profiles or user accounts of other users specified at 202, 226, 228 and 230, respectively, of FIGS. 2C-2D may be generated for display. In some embodiments, the SIMS may generate for display an indication of a total duration of and/or an elapsed time of the interactive session. In some embodiments, the SIMS may generate for display a selectable option to mute the user's own microphone and/or a selectable option turn off the user's own camera, a chat function, and any other suitable number or type of selectable options or information.

As shown in FIG. 2A, each of User A, User B, User C and User D may be respectively associated with digital representations 210, 212, 214 and 216. As shown in FIG. 2B, each of User A, User B, User C and User D may be respectively associated with digital representations 211, 212, 214 and 216. As shown in FIG. 2C, each of User A, User F, User G and User H may be respectively associated with digital representations 210, 232, 234 and 236. As shown in FIG. 2D, each of User A, User F, User G and User H may be respectively associated with digital representations 213, 232, 234 and 236.

Figure 4A:
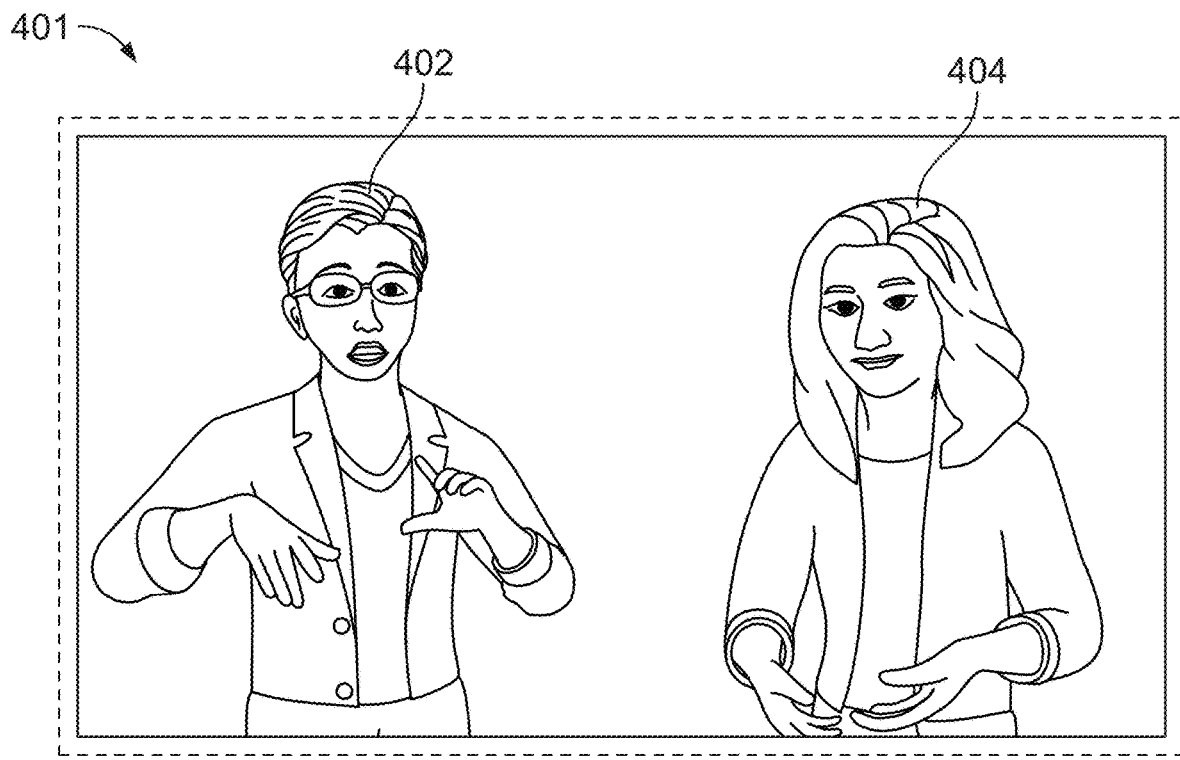
FIGS. 4A-4B depict illustrative interactive sessions, in accordance with some embodiments of this disclosure.
Figure 4B:
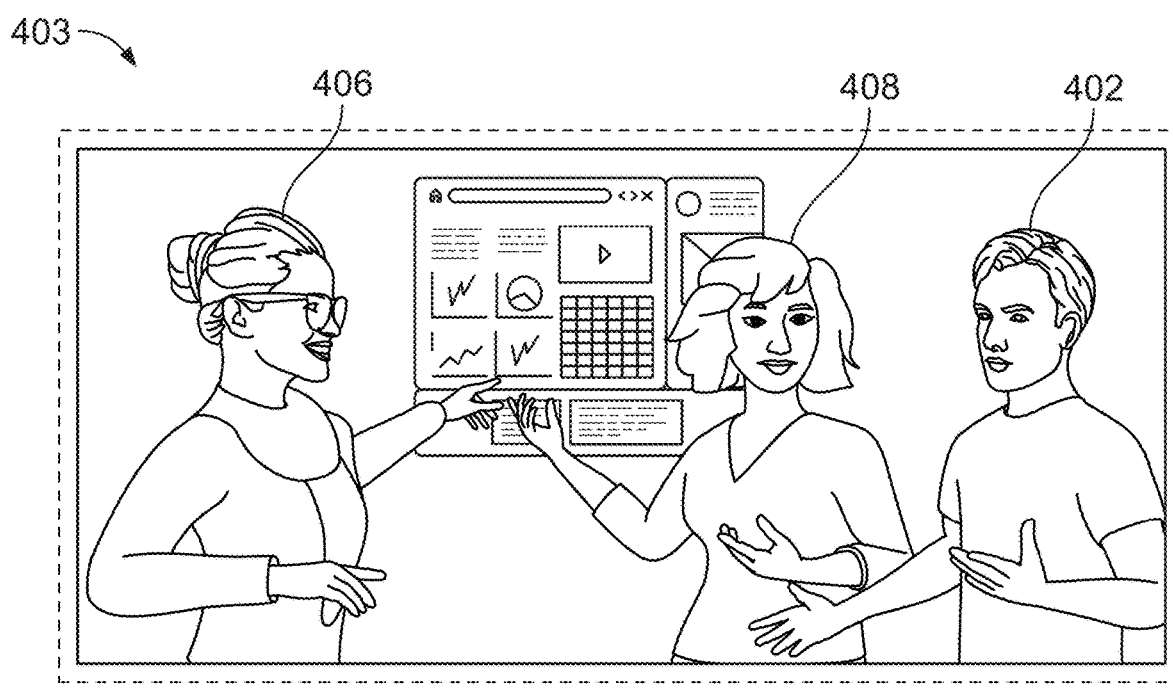

In some embodiments, each digital representation may correspond to a digital replica of facial and/or other bodily features or other elements of the appearance of the user, optionally modified by, e.g., XR portions or modified or altered with other suitable content or effects. In some embodiments, a digital representation may correspond to an avatar. The avatar may correspond to any suitable digital representation of a user, e.g., a replica of the user (e.g., as shown in FIG. 2A), an XR avatar (e.g., as shown in FIGS. 4A-4B), an animated or "cartoon" representation of a user, a memoji or emoji, or any other suitable digital representation, or any combination thereof. In some embodiments, the avatar for a particular user may resemble the user (e.g., facial and/or bodily features, clothing, etc.) or may not resemble the user (e.g., the user may like dogs and choose a digital representation of a dog has his or her avatar). In some embodiments, the SIMS may detect the real-world movements and actions of a user and cause the avatar to mimic such real-world movements and actions, e.g., to interact with objects or other avatars in an XR environment.

In some embodiments, the SIMS may generate for a particular user (e.g., User A) one or more active avatars and one or more sentient avatars. An active avatar may be understood as an avatar that a user is actively controlling within a particular environment, and/or a digital representation that mimics the movements and actions of a user in real time, and/or interacts with an environment based on commands or instructions received from a user (e.g., a video communication session environment of FIG. 2A, or an XR environment of FIG. 4). For example, digital representation 210 of FIGS. 2A and 2C may correspond to an active avatar, captured by a camera of device 201, which depicts real-world body language, facial features and body movements of User A.

A sentient avatar may be understood as an avatar generated by the SIMS and capable of being caused to enter a plurality of different interactive sessions simultaneously or at different times. In some embodiments, the sentient avatar may not be actively controlled by the user, e.g., may function as an autonomous bot for the purposes of gathering information regarding behavior of other users towards a representation of User A. For example, the SIMS may automatically, or based on received user instructions, cause sentient avatar 211 (FIG. 2B) to enter the interactive session corresponding to interactive session 104, and cause sentient avatar 213 (FIG. 2D) to enter the interactive session corresponding to interactive session 106. In some embodiments, the SIMS may cause one or more sentient avatars to join one or more interactive sessions in response to an input (e.g., a voice command, a touch input, selection of an option on a user interface, biometric input, or any other suitable input, or any combination thereof) associated with a particular interactive session. In some embodiments, the SIMS may generally cause sentient avatars to enter all interactive sessions a user is invited to or permitted to access based on a preference indicated in a user profile of User A, or may cause sentient avatars to enter interactive sessions that are scheduled to occur or are occurring at the same time. In some embodiments, the other users, e.g., Users B, C and D in FIGS. 2A-2B, and Users F, G, and H in FIGS. 2C-2D, may be represented by active avatars, even when User A is represented by sentient avatar 211 or 213, or one or more of such users may be represented by a sentient avatar, e.g., if such user's device is implementing the SIMS. In some embodiments, there may a limit as to how many sentient avatars of different users can be present in a single meeting, to avoid a scenario where a single active avatar is surrounding by only sentient avatars.

In the example of FIG. 2B, sentient avatar 211 may join candidate interactive session 104, and in the example of FIG. 2D, sentient avatar 213 may join interactive session 106, for the purpose of eliciting and monitoring behavior of an other user(s) in such interactive sessions in relation to User A associated with the sentient avatar, e.g., to gather the behavioral information discussed herein, such as, for example, specified in Tables 1-4. In some embodiments, sentient avatar 211 and 213 may be considered the same sentient avatar or may be considered different sentient avatars. In some embodiments, the SIMS may cause sentient avatar(s) for a particular user to enter any suitable number of interactive sessions simultaneously. In some embodiments, the sentient avatar may be configured to elicit behavior from other users but may not be capable of being actively controlled by the user in the manner that the active avatar is able to, or may be actively controlled upon user request to do so. In some embodiments, FIG. 2A may represent a scenario in which User A decides to join interactive session 104, e.g., after sentient avatar 211 gathers relevant behavioral information from other users in the interactive session, and FIG. 2C may represent a scenario in which User A decides to join interactive session 106, e.g., after sentient avatar 213 gathers relevant behavioral information from other users in the interactive session. In some embodiments, the SIMS may compute social inclusivity scores for Users B, C and D in relation to User A in real time while User A is participating in the interactive session, regardless of whether a sentient avatar is employed for such interactive session, and may either recommend User A stay in the current session or leave for a different session based on the computed scores. In some embodiments, FIG. 2B may correspond to a view from one of the devices of Users B, C or D, and FIG. 2D may correspond to a view from one of the devices of Users F, G or H, as User A may not be viewing the interactive session when the sentient avatar is participating.

In some embodiments, an appearance of a sentient avatar may be visually distinguished from an appearance of an active avatar. For example, digital representation 211 of User A may correspond to a sentient avatar having a translucent appearance as compared to digital representation 210 which may be an active avatar, which more closely resembles User A's appearance in the real world. In some embodiments, the sentient avatar may be indistinguishable from an active avatar, e.g., so other users act more naturally around the sentient avatar, which may be beneficial for the purposes of gathering behavioral information of the other users in relation to User A. Some embodiments may allow adjustable modes to adjust whether or not there is any indication that an avatar is distinguished as a sentient avatar. In some embodiments, the sentient avatar may correspond to any suitable image, avatar, hologram or other suitable representation. In some embodiments, a sentient avatar may have limited capabilities within a given environment as compared to the active avatar. For example, the SIMS may set a rule that sentient avatars 211 and 213 are unable to speak during an interactive session or may be unable to perform particular gestures or exhibit particular body language, whereas active avatars 210 and 212 may be capable of speaking and performing the particular gestures or exhibiting the particular body language. In some embodiments, while the sentient avatars are joining candidate interactive sessions for monitoring and gathering behavioral data of other user profiles in relation to User A, an active avatar associated with the user profile of User A may be inactive (e.g., the user may be waiting at a home page or other screen for feedback from the monitoring) or may also be participating in an interactive session.

During interactive sessions, the SIMS may be configured to monitor behavior of other users in relation to a particular user (e.g., represented by an active avatar such as in FIG. 2A or FIG. 2C, or a sentient avatar such as in FIG. 2B or FIG. 2D, in an interactive session) using any suitable combination of techniques. For example, the SIMS may monitor and analyze one or more of audio, body posture, body language, gestures or actions performed by the digital representations of each of the plurality of user profiles associated with the candidate interactive session in relation to the digital representation of the user, or analyze biometric signals (e.g., heart rate), or any other suitable technique may be employed, or any combination thereof.

In some embodiments, the SIMS may monitor for and analyze audio signals uttered by one or more users (or other audio signals) by digitizing audio signals received in analog form by one or more microphones of one or more devices joined to the interactive session, and may perform parsing of the audio input. For example, the SIMS may be configured to perform automatic speech recognition (ASR) to convert audio signals to a textual format. The SIMS may be configured to transcribe the audio input into a string of text using any suitable ASR technique. For example, one or more machine learning models may be employed, e.g., recurrent neural networks, bidirectional recurrent neural networks, LSTM-RNN models, encoder-decoder models, transformers, conditional random fields (CRF) models, and/or any other suitable model(s). Such one or more models may be trained to take as input labeled audio files or utterances, and output one or more candidate transcriptions of the audio file or utterance. In some embodiments, the SIMS may pre-process the received audio input for input into the neural network, e.g., to filter out background noise and/or normalize the signal, or such processing may be performed by the machine learning model. In some embodiments, in generating the candidate transcriptions, the voice processing application may analyze the received audio signal to identify phonemes (i.e., distinguishing units of sound within a term) within the signal, and utilize statistical probability techniques to determine most likely next phonemes in the received query. For example, the model may be trained on a large vocabulary of words, to enable the model to recognize common language patterns and aid in the ability to identify candidate transcriptions of voice input. Additionally or alternatively, transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety.

The SIMS may further employ natural language processing (NLP) including natural language understanding (NLU), e.g., tokenization of the string of the audio input, stemming and lemmatization techniques, parts of speech tagging, domain classification, intent classification and named entity recognition with respect to the received audio signals. In some embodiments, rule-based NLP techniques or algorithms may be employed to parse text included in the received audio signals. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, adjective, conjunction, participle, article); perform named entity recognition; and identify phrases, sentences, proper nouns, or other linguistic features of the text string. In some embodiments, statistical natural language processing techniques may be employed. In some embodiments, a knowledge graph may be employed to discern relationships among entities. In some embodiments, one or more machine learning models may be utilized to categorize one or more intents of the audio input. In some embodiments, the NLP system may employ a slot-based filling pipeline technique and templates to discern an intent of captured audio signals.

Based on such processing of the audio input, the SIMS may extract keywords to determine a topic that is being discussed, e.g., whether the particular user (e.g., User A) is being addressed or otherwise discussed, and if so, may identify a speaker, and whether the discussion regarding User A is positive or negative. In some embodiments, the SIMS may capture such audio clips, and provide a summary of such audio clips, or a live stream, to a user having a sentient avatar joined to the interactive session. In some embodiments, the SIMS may prompt the user for input regarding whether the audio clip is positive or negative towards the user (e.g., if the system's classification of certain behavior is below a certain confidence level), and/or for input regarding a social inclusivity score for certain participants and/or for certain interactive sessions.

In some embodiments, the SIMS may capture and analyze in real time a plurality of images of the digital representations of the users or avatars of the users participating in the interactive session. For example, the SIMS may include or be in communication with an image sensor to capture one or more images, and may utilize any suitable facial recognition algorithms and/or image processing techniques to identify or extract various facial features, body language or gestures of the digital representations or avatars of the captured images. The SIMS may compare the extracted features to those stored at a database, and/or utilize machine learning techniques, to classify the facial features or gestures shown in the image. In some embodiments, the SIMS computes a similarity score for a comparison between an extracted feature and a feature stored at the database, and may determine that there is a match if a computed similarity score exceeds a certain threshold. In some embodiments, the SIMS may generate an image signature or facial signature of a digital representation of a user. In some embodiments, the signature may comprise a feature vector including numerical values representing the various detected features, which may be compared to feature vectors to known emotional states or gestures (e.g., a feature or gesture indicative of a user being happy, interested, neutral, sad, disinterested, or surprised, or a gesture such as a smile, a frown, an eye roll, a thumbs-up, a thumbs-down, or any other suitable emotional state or gesture, or any combination thereof).

In some embodiments, the SIMS may perform processing to identify and classify users and/or other objects or text included in a captured image, and may determine whether such actions of, or the presence of, such users or objects or text reflect on a particular user. For example, the SIMS may employ image segmentation (e.g., semantic segmentation and/or instance segmentation) and classification to identify and localize different types or classes of entities in frames of a captured image. Such segmentation techniques may include determining which pixels or voxels belong to a depiction of a user, and/or which pixels or voxels should be mapped to a particular facial feature (e.g., head, nose, ear, eyes, shoulder, mouth, etc.) or any other suitable feature of User A, or which pixels or voxels should be mapped to a particular object. For example, the SIMS may employ machine learning, computer vision, object recognition, pattern recognition, facial recognition, image processing, image segmentation, edge detection, or any other suitable technique or any combination thereof. Additionally or alternatively, the SIMS may employ color pattern recognition, partial linear filtering, regression algorithms, and/or neural network pattern recognition, or any other suitable technique or any combination thereof.

Figure 3A:
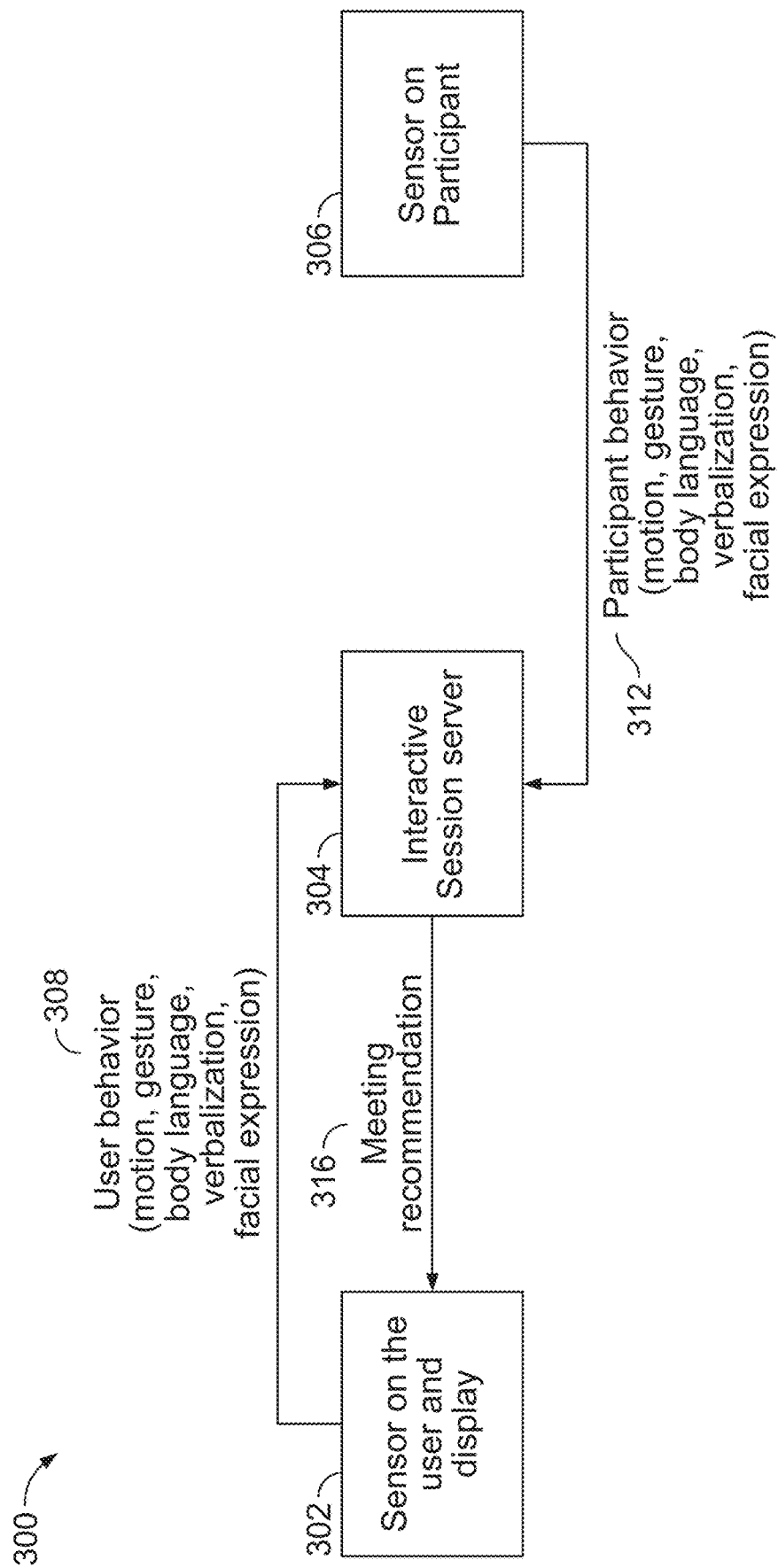
FIGS. 3A-3B depict a block diagram of a system and a flowchart, respectively, of a process performed by the system, in accordance with some embodiments of this disclosure.
Figure 3B:
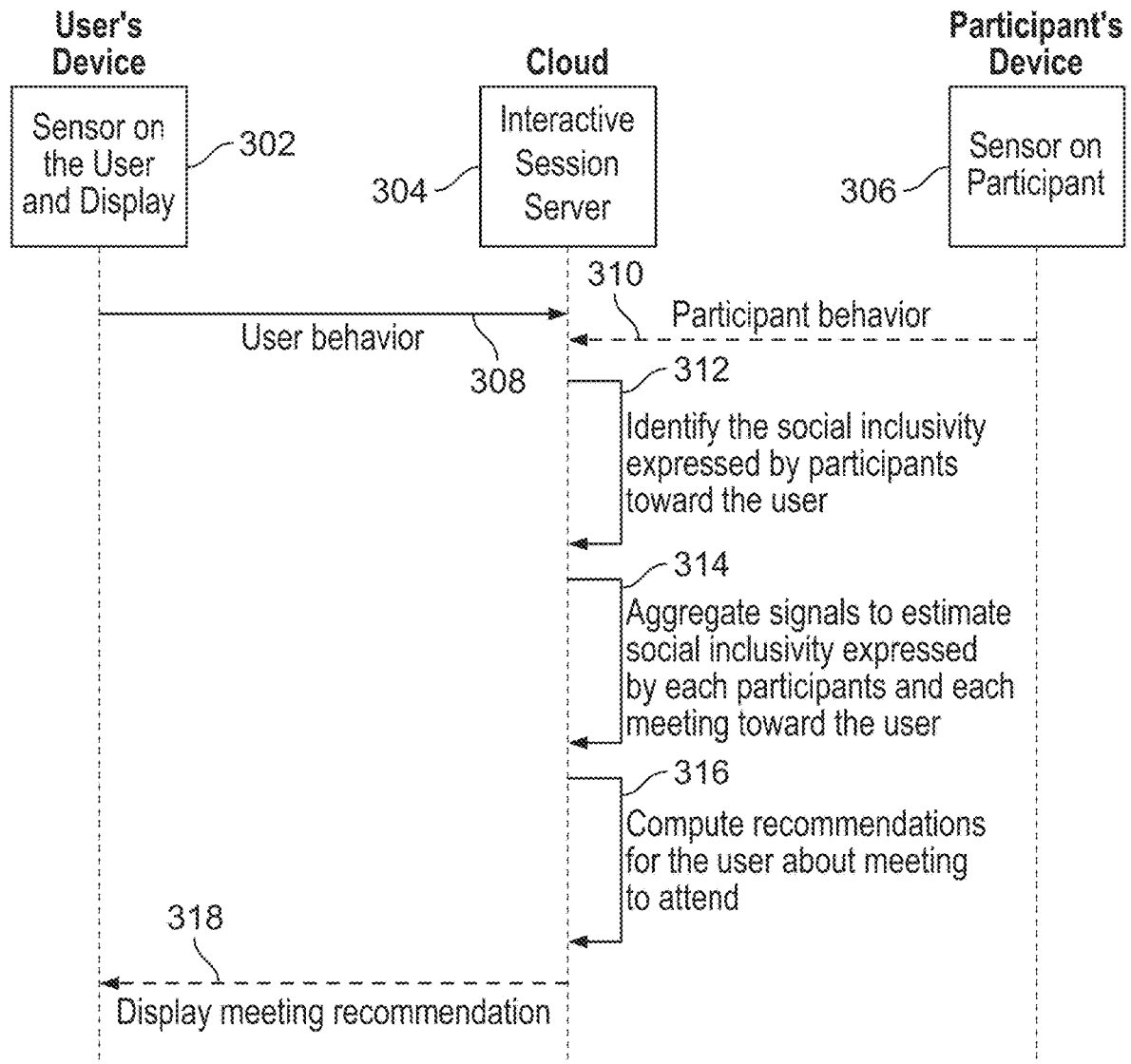

FIGS. 3A-3B show a block diagram of system 300 and a flowchart of a process performed by system 300, respectively, in accordance with some embodiments of this disclosure. In some embodiments, the components of system 300 may be included in the SIMS. System 300 may include component 302, which may correspond to device 201 of User A. In some embodiments, device 201 may be present in a smart meeting room comprising hardware and software to facilitate video communication sessions. Component 302 may include one or more sensors to capture various modes of behavior of User A, e.g., text, speech, gestures, eye gaze, or other suitable behavior, or any combination thereof, as shown at 308. System 300 may include component 306, which may correspond to a device 203 of FIG. 2B or device 205 of FIG. 2D. In some embodiments, device 203 or 205 may be present in a same or different smart meeting room comprising hardware and software to facilitate video communication sessions. Component 306 may include one or more sensors to capture various modes of behavior of users (e.g., Users B, C or D, or Users F, G or H) in relation to User A, e.g., text, speech, gestures, eye gaze, or other suitable behavior, or any combination thereof, as shown at 310 of FIG. 3B. System 300 may include interactive session server 304 which may be configured to receive information 308 from component 302 and information 310 from component 306. In some embodiments, the SIMS may be configured to perform at least a portion of the functionalities described herein, e.g., generating social inclusivity scores for one or more interactive sessions and/or for participants or invitees thereof (at 312 and 314 shown in FIG. 3B), and computing and providing recommendations (at 316 and 318) of interactive session(s) based on the social inclusivity scores.

FIGS. 4A-4B show illustrative interactive sessions, in accordance with some embodiments of this disclosure. As shown in the example of FIG. 4A, the SIMS may generate XR environment 401. As shown in the example of FIG. 4B, the SIMS may generate XR environment 403. In some embodiments, such XR environments may correspond to a digital representation or digital twin of a real physical environment surrounding a user, or may correspond to a digital representation of any suitable real location or place remote from the user or may correspond to a digital representation of a fictional environment (e.g., from a video game, book, movie, TV show or any other suitable fictional environment). In some embodiments, an other user(s) or entity(ies) may be participating in a XR session with a particular user, and a digital representation (e.g., an avatar) of such other user(s) within XR environment 401 or 403 may be displayed, and/or a digital representation (e.g., avatar) of a particular user may be displayed. For example, the avatars may show a location of the user within the XR environment and facilitate and depict user interactions with the XR environment. In some embodiments, generating for display XR environment 401 or 403 may correspond to generating for display a video or images corresponding to XR environment 401 or 403 and/or other suitable content.

As shown in the example of FIG. 4A, the SIMS may cause a digital representation 402 of a user (e.g., a user named Jimmy) to enter XR environment 401. For example, XR environment 401 may be a VR environment, and digital representation 402 may correspond to a sentient avatar associated with a user profile of the user Jimmy. In the example of FIG. 4B, XR environment 403 may be a VR environment, and digital representation 404 may correspond to a sentient avatar associated with a user profile of the user Jimmy. In some embodiments, sentient avatars 402 and 404 may have the same or different appearances from each other, and may have a distinct appearance from an active avatar associated with a user profile of the user Jimmy. A user in a virtual world may have multiple avatars, and the SIMS may cause a user's avatars to be sent to multiple interactive sessions to obtain information regarding their social inclusivity for the user. Based on that information, the SIMS may provide a recommendation for an interactive session that the user may join. In some embodiment, such techniques may be used in even if there is no prior history of interaction between the user and the other participants of the interactive session. In some embodiments, historical interactions as between users may be taken into account in recommending interactive sessions, and/or an historical social inclusivity score as between users may be updated based on interactions presently occurring with a user's sentient and/or active avatar.

In a non-limiting illustrative example, the user Jimmy may be a new employee at a consulting company and may be going through training and/or a meet and greet at his new company. The company may implement such training and/or meet and greet in a virtual environment. The user Jimmy may be presented with the option to join one of multiple interactive sessions, e.g., a first interactive session associated with environment 401 and a second interactive session associated with environment 403. In some embodiments, the interactive sessions may be occurring at the same time, and thus the user Jimmy may have to decide which interactive session to attend with his virtual avatar. To aid the user Jimmy in his decision, the SIMS may receive input from Jimmy to cause sentient avatars 402 and 404 to respectively join the first interactive session associated with environment 401 and the second interactive session associated with environment 403. In some embodiments, the sentient avatars may be participating in the interactive sessions at the same time, or at different times.

In the example of FIG. 4A, the SIMS may, based on an instruction from the user Jimmy or automatically without instruction from the user, cause sentient avatar 402 associated with Jimmy's user profile to move towards digital representation 404, e.g., an active avatar associated with a user profile of another user, Brittany, or may cause sentient avatar 402 to otherwise explore XR environment 401. The SIMS may use sentient avatar 402 as a vehicle to monitor how Jimmy's digital representation is received by other users present in XR environment 401, based on the techniques discussed herein. For example, the SIMS may determine that the digital representation 404 of the user Brittany is interacting with other avatars and does not make any welcoming move in relation to sentient avatar 402 representing Jimmy, or acknowledge the presence of sentient avatar 402 representing Jimmy. Based on these interactions, the SIMS may assign a negative social inclusivity score to the interactive session shown at FIG. 4A.

In the example of FIG. 4B, as shown in XR environment 403, the SIMS may cause sentient avatar 402 representing Jimmy to approach active avatars 406 and 408, which may be virtual avatars representing other colleagues of Jimmy. The SIMS may detect, based on the techniques discussed herein, that each of avatars 406 and 408 quickly acknowledge Jimmy's sentient avatar 404 verbally and turn their bodies towards Jimmy's sentient avatar 404. Based on these interactions, the SIMS may assign a positive social inclusivity score to the interactive session shown at FIG. 4B. Thus, the SIMS may recommend to the user Jimmy to join the interactive session shown at FIG. 4B, since this interactive session's participants were more receptive to Jimmy's sentient avatar as compared to the participant(s) of FIG. 4A. For example, the SIMS may cause a user interface to present each of the interactive session options in a ranked order accentuating an option to join the interactive session shown at FIG. 4B with Jimmy's active avatar, such as described in connection with FIG. 1A. While the examples of FIGS. 4A-4B show a sentient avatar being sent to two different interactive sessions, it should be appreciated that one or more sentient avatars may be sent to any suitable number of interactive sessions at a particular time. In some embodiments, one or more sentient avatars may be sent to multiple different types of environments and/or across different applications at once, e.g., a video conference such as shown in FIG. 2B as well an XR environment such as shown in FIG. 4B.

In some embodiments, in detecting behavior of other users towards a particular user's digital representation in an interactive session, gaze of the particular user and/or such other user's digital representations and/or a field of view (FOV) of the particular user and/or such other user's digital representations may be detected, e.g., to determine whether users are making eye contact or turning towards one another. An FOV may be understood as a portion of an environment (real or virtual or any suitable combination thereof) that is captured by a camera of a user device at a given time, and/or presented to the user at a given time by the user device (e.g., an angle in a 360-degree sphere environment, or any suitable number of degrees). In some embodiments, the FOV may comprise a pair of two-dimensional (2D) images to create a stereoscopic view in the case of a VR device; in the case of an AR device (e.g., smart glasses), the FOV may comprise 3D or 2D images, which may include a mix of real objects and virtual objects overlaid on top of the real objects using the AR device (e.g., for smart glasses, a picture captured with a camera and content added by the smart glasses). If an XR environment has a single degree of freedom, e.g., a rotation of 360 degrees, any FOV may be defined by either the edge angular coordinates (e.g., +135 degrees, +225 degrees) or by a single angular coordinate (e.g., −55 degrees) combined with the known angular opening of the FOV. If an XR environment has six degrees of freedom, such as, for example, three rotations of 360 degrees and three spatial positions, any FOV may be defined by three angular coordinates and three spatial coordinates. An FOV may therefore be understood as a portion of an environment displayed when the user is at a particular location in the environment and has oriented the display device in a particular direction.

In some embodiments, the active avatar (e.g., in a video conference environment or an XR environment) may take explicit actions on behalf of a user. For example, a user's active avatar may ask or answer questions, participate in long negotiations, commit the user to particular actions, promise to lend the user a lawnmower, attend a dinner, or perform any other suitable action, or any combination thereof. In some embodiments, the sentient avatar may be usable to present the user in the interactive session (e.g., in an XR environment), move about the environment of the interactive session, sense how others are reacting to the representation of the user, collect behavioral data of other users to enable observations to be made, and/or may show themselves and gather information from others. In some embodiments, a user profile may be associated with only one active avatar, and may have one or more sentient avatars. For example, a user may have multiple sentient avatars, and these may simultaneously be distributed across interactive clusters, with no more than one sentient avatar of the same user being in the same interactive session.

In some embodiments, active avatars may appear more like the user they are intended to represent than the sentient avatars; sentient avatars may be more ethereal. For example, sentient avatars for a user may be more translucent than active avatars, may appear with a halo or a different textual or graphical indicator, may be shown in a different color or texture or shape or size, or any combination thereof, or may differ in any other suitable respect from the active avatar for the user. In some embodiments, there may be enough similarity between a sentient avatar and an active avatar of the same user (e.g., in appearance and behaviors exhibited) such that other users recognize that the sentient avatar represents that user, and thus behavioral feedback from those users may be more useful. At the same time, the sentient avatar may be sufficiently visibly different from an active avatar of the same user so that other users do not misrecognize it as an active avatar, since such misrecognition may cause frustration through failed interactions. In some embodiments, the capabilities and appearance of the sentient avatar and the active avatar may be adjusted based on user preferences and/or based on certain circumstances or types of interactive sessions. In some embodiments, the sentient avatar or the active avatar may be configured to exhibit behaviors based on preset rules for a particular environment, and/or based on behaviors of other entities in the environment, such as, for example, without explicit instructions from a user.

In some embodiments, the SIMS may utilize the sentient avatars to enable a user to take a quick look at other users interacting in one or more interactive sessions. The reactions elicited by the user's sentient avatar, e.g., when aggregated, can give a sense of how open and welcoming the interactive session is, and such information may be used as input for deciding which interactive session to recommend and/or join. In some embodiments, a sentient avatar may remain in an interactive session for at least a threshold period of time, to provide for time to monitor behaviors of other users. In some embodiments, the threshold period of time may be a default period of time automatically set by the SIMS or may be set by the user. In some embodiments, the threshold period of time may vary as a function of an anticipated duration of an interactive session, e.g., five minutes if an interactive session is scheduled for 30 minutes, or 10 minutes if an interactive session is scheduled for one hour. In some embodiments, the sentient avatar may remain in an interactive session until a threshold number of behavioral feedback inputs are received from other users overall or from each particular user participating in the interactive session. In some embodiments, the sentient avatar may remain in a particular interactive session until receiving instructions from a user to exit the interactive session, or until the user's active avatar joins the interactive session, at which point the sentient avatar may exit the interactive session. In some embodiments, other users in an interactive session may be notified that a sentient avatar is present rather than an active avatar, and/or such users may be notified when an active avatar replaces the sentient avatar of a user in the interactive session.

In some embodiments, the SIMS may include more than one active avatar for the same user. In such an instance, the SIMS may be configured to ensure that various active avatars are behaving consistently. For example, the SIMS may prevent active avatars from committing to attend virtual events occurring at the same time (e.g., competing dinners with different virtual avatars), or from using the same object at the same time for different purpose (e.g., lending out a same virtual lawnmower to different avatars). For example, the SIMS may provide a notification to a user, based on detecting speech or other actions or movements in the interactive session and comparing such detected information to prior detected information, that a current interaction with another virtual avatar conflicts with a previous conversation or planned virtual event associated with the avatar.

In some embodiments, the SIMS may configure a sentient avatar to appear "natural" to others (e.g., other users or programmed avatars participating in an interactive session). For example, a sentient avatar may be configured to shift its posture by moving its weight from one leg to another if the sentient avatar been standing for a long time. As another example, the sentient avatar may be configured to check the time, adjust its glasses, move its eyes and head toward other speakers or avatars (which may be an effective way of eliciting feedback from such other avatars in relation to the sentient avatar), wave to other avatars, dance if other avatars are dancing, and/or perform any other suitable actions or movements. Such actions or movements may create a more natural atmosphere for other active avatars to react to the sentient avatar. In some embodiments, sentient avatars may not perform overt actions other than movements and/or gestures. In some embodiments, sentient avatars do not speak or provide input. Alternatively, sentient avatars may be configured to speak, e.g., to say simple words or phrases such as "Hello" or "Thank you," which may resemble the voice of the user associated with the sentient avatar.

In some embodiments, a user may be provided in real time updates of a social inclusivity score of an interactive session and/or a social inclusivity score of one or more participants in the interactive session, while the user's sentient avatar is participating in the interactive session. In some embodiments, a user may be provided with a summary of important clips or snippets or highlight videos of interactions that other users had with the user's sentient avatar, e.g., showing that no other user's avatars made eye contact with the user's sentient avatar. In some embodiments, the SIMS may provide the user with an option to view a live stream of the user's sentient avatar's interactions with other users in the interactive session, or view the environment from the perspective of the sentient avatar.

In some embodiments, it may be desirable to recommend to a user an interactive session that is related to a topic the user does not necessarily like or is related to a viewpoint the user does not necessarily share. For example, the SIMS may detect, e.g., via the sentient avatar and/or metadata or other monitoring of an interactive session, that the interactive session is associated with a particular opinion on politics or sports that the user is unlikely to agree with, or is related to a topic that user has not shown interest in in the past. In this instance, a user may be provided with a recommendation to join this interactive session in order to be exposed to a different viewpoint than he or she is accustomed to, and/or to provide the user with an opportunity to share his or her opinion on the subject.

In some embodiments, the SIMS may provide for a system and method for using sentient social avatars to recommend interactive sessions (e.g., meeting clusters) based on social inclusivity expressed by other avatars. Such system and method may comprise creating one or more sentient avatars for a user and sending a sentient avatar to a VR cluster occupied by one or more active avatars belonging to other users. Such system and method may further comprise identifying behavioral signals indicative of social inclusivity expressed by participants towards the sentient avatar, and aggregating these signals to form estimates of the social inclusivity expressed by individual participants towards the sentient avatar. Such system and method may further comprise displaying a recommendation for a meeting based on the social inclusivity expressed by the other participants of the interactive session.

Figure 5A:
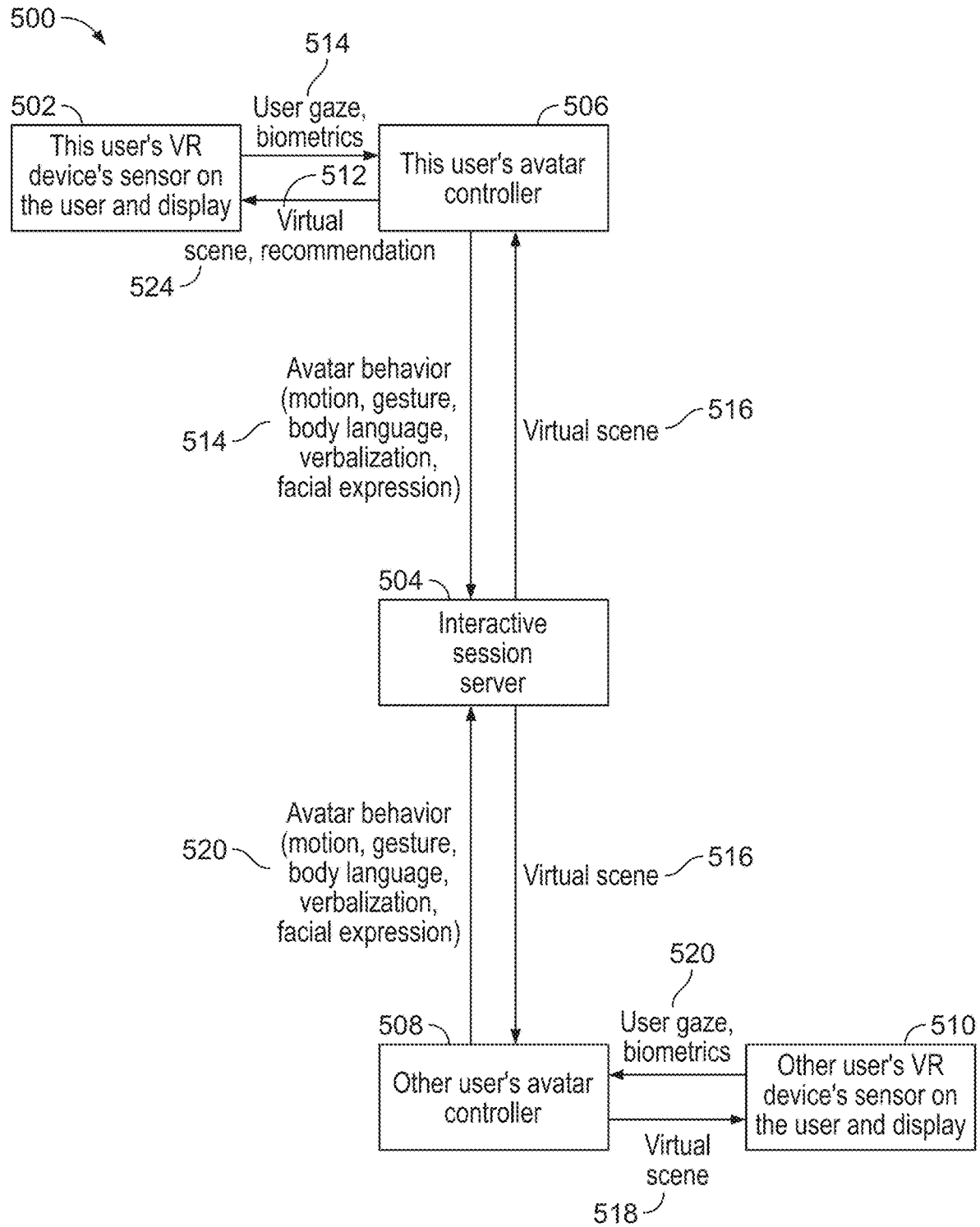
FIGS. 5A-5B depict a block diagram of a system and a flowchart, respectively, of a process performed by the system, in accordance with some embodiments of this disclosure.
Figure 5B:
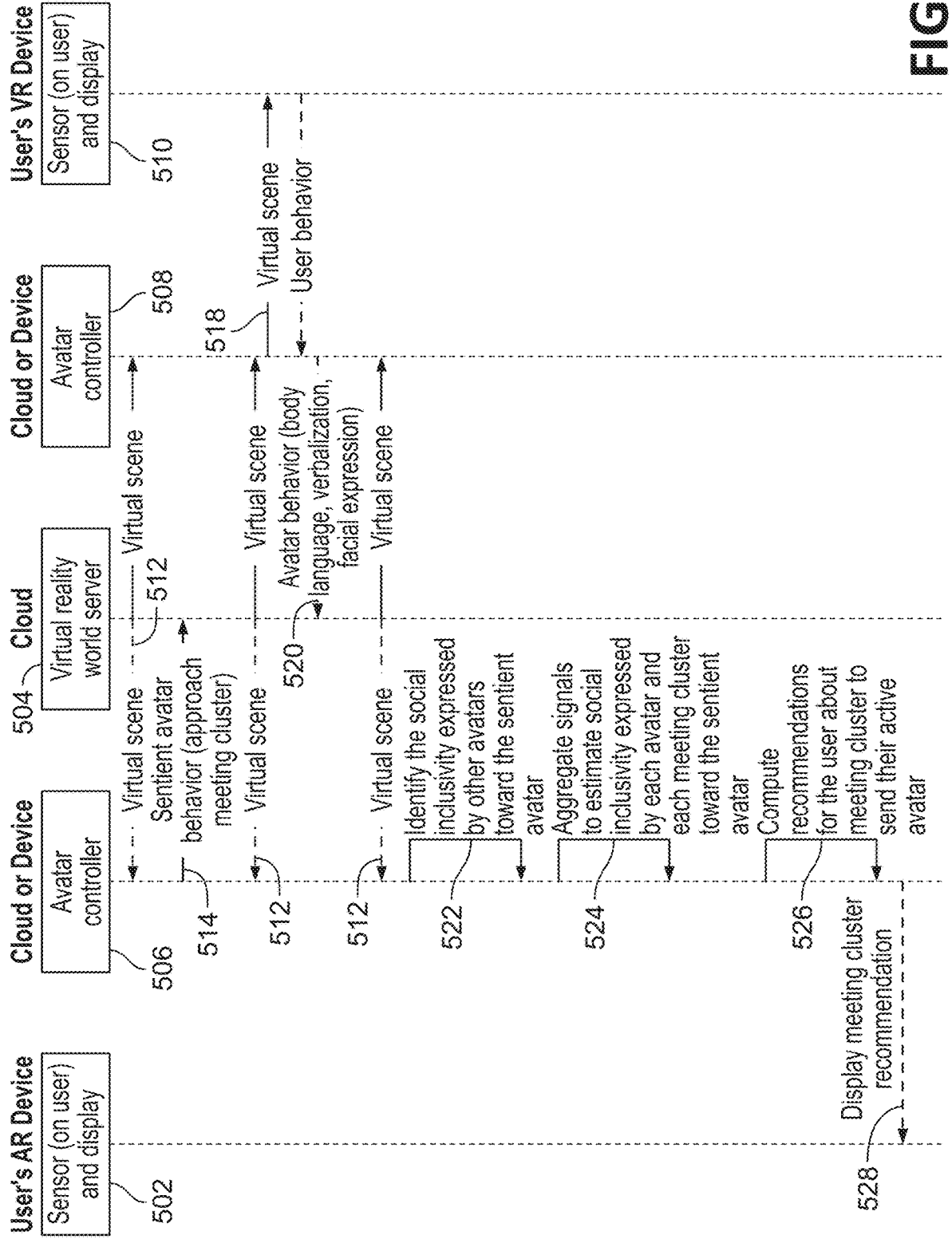

FIGS. 5A-5B show a block diagram of system 500 and a flowchart of a process performed by system 500, respectively, in accordance with some embodiments of this disclosure. In some embodiments, the components of system 500 may be included in the SIMS. System 500 may include interactive session server 504, which may be an XR world server or XR environment server that receives avatar behavior information from avatar controllers 506 and of system 500. Server 504 may generate and transmit or continually broadcast an XR scene or a virtual scene 516 to avatar controller 506 (e.g., of a user's XR device indicated at 502), and at 512 such XR scene or virtual scene may be provided to the user's XR device indicated at 502. Avatar controller 506 may interface with the user and capture, via one or more sensors, various modes of behavior of an avatar (e.g., when an active avatar or a sentient avatar may approach one or more other participants in a VR) of the user in the provided XR environment, e.g., user gaze and biometrics at 514. In some embodiments, the behavior of the avatar (e.g., motion, gesture, body language, verbalization, facial expression and/or any other suitable behavior) may be provided as part of 514 to server 504. As shown at 518, the SIMS may cause server 504 to continually broadcast the virtual scene to avatar controllers (e.g., of users who are logged in). As an example, such virtual scene may be shared every time it is detected to change, and the avatar controllers may determine what should be displayed to respective users (e.g., the scene in its entirety or by selecting a portion thereof), producing behaviors that appear in the XR world.

Similarly, server 504 may generate and transmit or continually broadcast an XR scene or a virtual scene 516 to avatar controller 508 (e.g., of a user's XR device indicated at 510), and at 518, such XR scene or virtual scene may be provided to the user's XR device indicated at 510. Avatar controller 508 may interface with the user and capture, via one or more sensors, various modes of behavior of an avatar (e.g., an active avatar or a sentient avatar) of the user in the provided XR environment, e.g., user gaze and biometrics at 520. In some embodiments, the behavior of the avatar (e.g., motion, gesture, body language, verbalization, facial expression and/or any other suitable behavior, or other reactions in response to the sentient avatar) may be provided as part of 520 to server 504. In some embodiments, there may be any suitable number of instances of users and corresponding user's avatar controllers and XR devices for each user. In some embodiments, the SIMS may be configured to perform at least a portion of the functionalities described herein, e.g., generating social inclusivity scores for one or more interactive sessions and/or for participants or invitees thereof (at 522 and 524), and computing and providing recommendations (at 526 and 528) of interactive session(s) based on the social inclusivity scores. In some embodiments, the SIMS can maintain a model of the user, e.g., the user's profile.

In some embodiments, the SIMS may enable a user to see social inclusivity scores of other users in relation to the user (and/or in relation to other users expected to participate in an interactive session) while the user is creating the interactive session. For example, it may be desirable for a user to invite certain users to an interactive session if such users have positive social inclusivity scores in relation to the user creating the interactive session and/or in relation to other users. In some embodiments, the SIMS may prompt a user to add a particular user to an interactive session based on the particular user's social inclusivity score with respect to the user creating the interactive sessions or to another user participating or expected to participate in the interactive session.

In some embodiments, the SIMS may enable a user to specify that the user should be provided an alert if his or her social inclusivity score is below a certain threshold or above a certain threshold, or to be provided an alert when another user's social inclusivity score is below a certain threshold or above a certain threshold. In some embodiments, the SIMS may enable a first user to request to be provided with a notification or recommendation if, instead of a second user with a relatively low or negative social inclusivity score in relation to the user, there exists a third user having a similar skillset (e.g., a similar job title) to the second user and that such third user has a higher social inclusivity score with respect to the first user and/or other users in the meeting. In some embodiments, the SIMS may enable a user to request a reconfiguration of one or more users invited to attend an interactive session based on the social inclusivity scores of one or more of such users.

In some embodiments, the SIMS may assign each user in an application (e.g., Microsoft Teams or Zoom) a sentient avatar that is personalized to that user. In some embodiments, a user may join a call for such an application with a sentient avatar option, and the sentient avatar may be automatically created having physical characteristics of the user and the sensing properties, which may be defined universally for sentient avatars or defined on an individualized basis. In some embodiments, a user may take over the sentient avatar during an interactive session to convert the user's digital representation into an active avatar. In some embodiments, a user may instruct his or her sentient avatar to exit an interactive session. In some embodiments, the physical characteristics of the sentient avatar may change based on the input from other users' avatars during an interactive session. For example, the sentient avatar may change color, size, or graphical details to reflect how other users are behaving in relation to the sentient avatar. In some embodiments, the sentient avatar may change location based on the input from other users' avatars. For example, the sentient avatar may slowly move towards the (real or virtual) door if behavioral data indicates the sentient avatar is not being welcomed or is receiving negative reactions. This may provide feedback to the other users' avatars about the social inclusivity that they are displaying in relation to the sentient avatar.

In some embodiments, a sentient avatar may go into a (real or virtual) meeting room or other location that is currently vacant and await the arrival of one or more other users' active avatars. If an active avatar chooses to enter the meeting room after seeing the sentient avatar, this may be interpreted as a positive signal of social inclusivity with respect to that active avatar. If an active avatar peeks in and departs quickly, this may be interpreted as a negative signal of social inclusivity with respect to that active avatar. In some embodiments, the aggregation may be adjusted to take into account any prior familiarity with other users' active avatars, such that the base expected social inclusivity may be more positive for a familiar active avatar.

In some embodiments, a recommendation of a candidate interactive session may be adjusted or performed based at least in part on the profile of the user. For example, for an avatar associated with a user profile indicating social anxiety, such avatar may be recommended to go to the most welcoming interactive session even if the user already knows most people present there. A user's apparent social anxiety could be inferred from monitoring the user's behavior or other methods, e.g., the user filling out a profile form or a designated person filling out a profile form on behalf of the user. In some embodiments, such a designated person may be relevant for networking in an educational setting or other setting, such as, for example, where the user is a minor.

In some embodiments, a recommendation of a candidate interactive session may be adjusted or performed based at least in part on needs of the user or needs of their enterprise or organization. For example, a user who is required during his or her employment to interact with users from another department (e.g., an engineering team member to work with the product team) may be recommended to go to a most welcoming interactive session that has at least one product team member or to an interactive session that is not the most welcoming but includes a product team member who is the most welcoming of all the product team members at the current event. In this case, the SIMS may compute a suitability score of an interactive session for the user based on its relevance to the user's goals or job requirements. In some embodiments, such a suitability score may be combined with social inclusivity scores, and the SIMS may recommend that a user join a particular interactive session having a highest combined score.

In some embodiments, the SIMS may assign a suitability score and/or combined score (based on the suitability score and one or more social inclusivity scores) to each candidate interactive session, based on the criteria specified in Table 4 below. For example, the first two rows of Table 4 indicate that an interactive session with too few current participants (e.g., below a first threshold) or with too many current participants (e.g., above a second threshold) may be down-weighted. The third row of Table 4 indicates that an interactive session with participants of a specified specialty or affiliation may be up-weighted. The fourth row of Table 4 indicates that an interactive session that has at least one participant who is highly welcoming in relation to the user (e.g., is associated with a social inclusivity score that exceeds a threshold) may be up-weighted.

TABLE 4

| Condition | True | False |
| --- | --- | --- |
| Interactive session contains fewer than a threshold number of participants | −1 | 0 |
| Interactive session contains greater than a threshold number of participants | −1 | 0 |
| Interactive session contains participants of a specified specialty of affiliation | 1 | 0 |
| Interactive session contains at least one highly welcoming participant | 1 | 0 |

Figure 6:
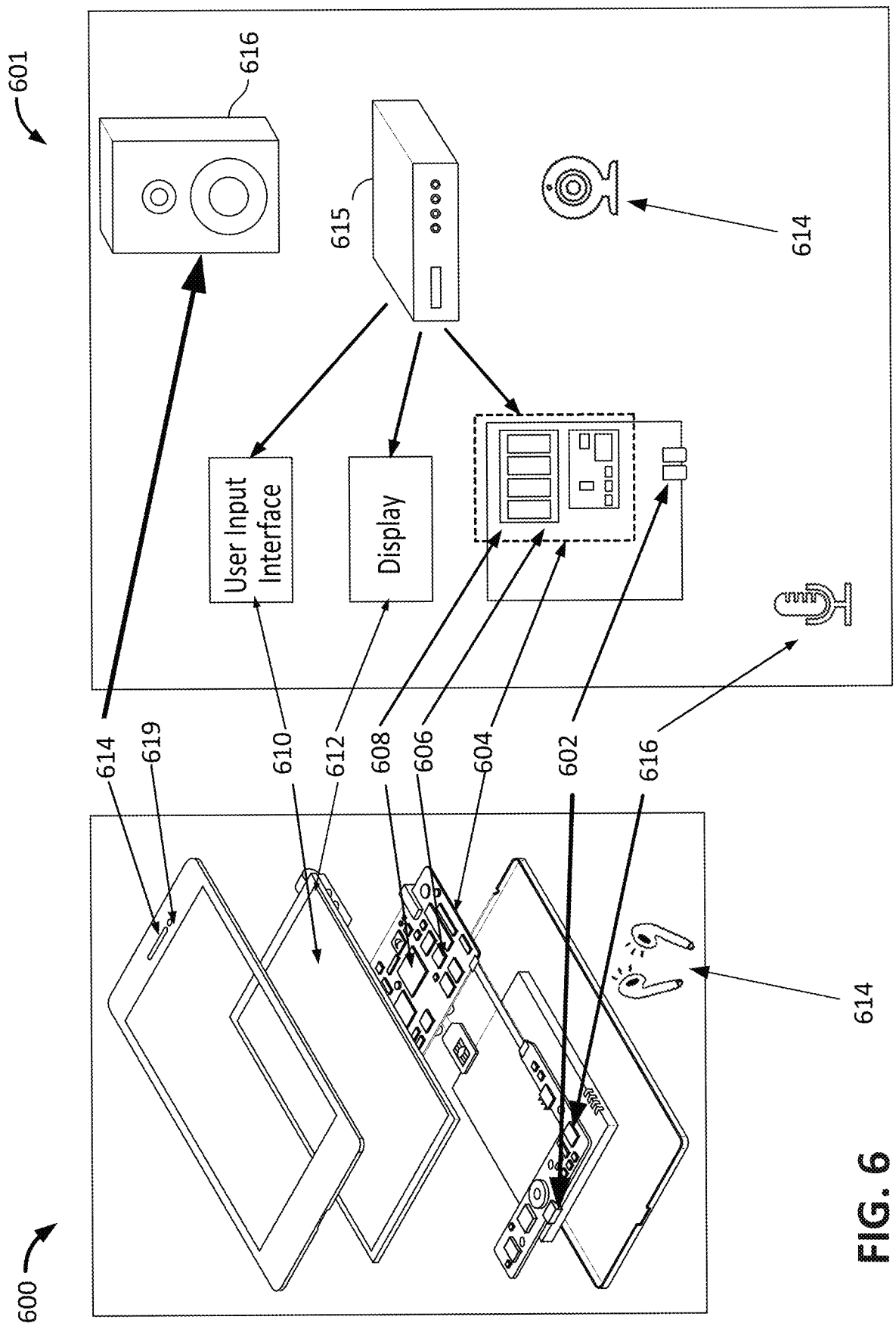
FIGS. 6-7 depicts illustrative devices, systems, servers, and related hardware for recommending an interactive session based on a social inclusivity score, in accordance with some embodiments of the present disclosure.

FIGS. 6-7 shows illustrative devices, systems, servers, and related hardware for recommending an interactive session based on a social inclusivity score, in accordance with some embodiments of the present disclosure. FIG. 6 shows generalized embodiments of illustrative user devices 600 and 601, which may correspond to, e.g., devices 201, 203 and 205 of FIGS. 2A-2D and devices associated with 302 and 306 of FIG. 3A and 502 and 510 of FIG. 5A. For example, user device 600 may be a smartphone device, a tablet, a near-eye display device, a XR (e.g., virtual reality or augmented reality or mixed reality) device, or any other suitable device capable of participating in an interactive video session or other media communication session (e.g., in real time or otherwise) over a communication network. In another example, user device 601 may be a user television equipment system or device. User device 601 may include set-top box 615. Set-top box 615 may be communicatively connected to microphone 616, audio output equipment (e.g., speaker or headphones 614), and display 612. In some embodiments, microphone 616 may receive audio corresponding to a voice of a video conference participant and/or ambient audio data during a video conference. In some embodiments, display 612 may be a television display or a computer display. In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 7. In some embodiments, device 600 may comprise any suitable number of sensors (e.g., gyroscope or gyrometer, or accelerometer, etc.), and/or a GPS module (e.g., in communication with one or more servers and/or cell towers and/or satellites) to ascertain a location of device 600. In some embodiments, device 600 comprises a rechargeable battery that is configured to provide power to the components of the device.

Each one of user device 600 and user device 601 may receive content and data via input/output (I/O) path 602. I/O path 602 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., device 600), an XR device, a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for the SIMS stored in memory (e.g., storage 608). Specifically, control circuitry 604 may be instructed by the SIMS to perform the functions discussed above and below. In some implementations, processing or actions performed by control circuitry 604 may be based on instructions received from the video communication application.

In client/server-based embodiments, control circuitry 604 may include communications circuitry suitable for communicating with a server or other networks or servers. The SIMS may be a stand-alone application implemented on a device or a server. The SIMS may be implemented as software or a set of executable instructions. The instructions for performing any of the embodiments discussed herein of the SIMS may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the SIMS may be a client/server application where only the client application resides on device 600 (e.g., device 201 of FIGS. 2A), and a server application resides on an external server (e.g., server 704 of FIG. 7 which may correspond to server 304 of FIG. 3A and/or server 504 of FIG. 5A). For example, the SIMS may be implemented partially as a client application on control circuitry 604 of device 600 and partially on server 704 as a server application running on control circuitry 711. Server 704 may be a part of a local area network with one or more of devices 600, 601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 704 and/or an edge computing device), referred to as "the cloud." Device 600 may be a cloud client that relies on the cloud computing capabilities from server 704 to generate a digital representation (e.g., a sentient avatar) of a user, monitor behavior of other user's digital representations in relation to the digital representation of the user, generate recommend an interactive session based on the social inclusivity score. When executed by control circuitry of server 704, the SIMS may instruct control circuitry 611 to perform such tasks. The client application may instruct control circuitry to determine such tasks. In some embodiments, the video conference may correspond to one or more of online meetings, virtual meeting rooms, video calls, Internet Protocol (IP) video calls, etc.

Control circuitry 604 may include communications circuitry suitable for communicating with a video communication or video conferencing server, XR content servers, social networking servers, video gaming servers, edge computing systems and devices, a table or database server, or other networks or servers. The instructions for carrying out the above mentioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user devices, or communication of user devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as SIMS data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and downconverting content into the preferred output format of device 600. Control circuitry 604 may also include digital-to-analog converter circuitry and analog-to-digital converter circuitry for converting between digital and analog signals. The tuning and encoding circuitry may be used by user device 600, 601 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user device 600 and user device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The SIMS may be implemented using any suitable architecture. For example, it may be a stand-alone application wholly-implemented on each one of user device 600 and user device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide video conferencing functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a conference participant profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the SIMS is a client/server-based application. Data for use by a thick or thin client implemented on each one of user device 600 and user device 601 may be retrieved on-demand by issuing requests to a server remote to each one of user device 600 and user device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

In some embodiments, the SIMS may be downloaded and interpreted or otherwise run by an interpreter or virtual machine (run by control circuitry 604). In some embodiments, the SIMS may be encoded in the ETV Binary Interchange Format (EBIF), received by control circuitry 604 as part of a suitable feed, and interpreted by a user agent running on control circuitry 604. For example, the SIMS may be an EBIF application. In some embodiments, the SIMS may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), SIMS may be, for example, encoded and transmitted in an MPEG-2 object carousel with the MPEG audio and video packets of a program.

As shown in FIG. 7, devices 706, 707, 708, and 710 may be coupled to communication network 709. In some embodiments, each of devices 706, 707, 708, and 710 may correspond to one of devices 600 or 601 of FIG. 6, devices 201, 203 or 205 of FIGS. 2A-2D, devices associated with 302 and 306 of FIG. 3A or 502 and 510 of FIG. 5A, or any combination thereof. Communication network 709 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 709.

System 700 may comprise media content source 702, one or more servers 704, and/or one or more edge computing devices. In some embodiments, the SIMS may be executed at one or more of control circuitry 711 of server 704 (and/or control circuitry of user devices 706, 707, 708, 710 and/or control circuitry of one or more edge computing devices). In some embodiments, media content source 702 and/or server 7404 may be configured to host or otherwise facilitate interactive sessions between user devices 706, 707, 708, 710 and/or any other suitable devices, and/or host or otherwise be in communication (e.g., over network 709) with one or more social network services.

In some embodiments, server 704 may include control circuitry 711 and storage 714 (e.g., RAM, ROM, Hard Disk, Removable Disk, etc.). Storage 714 may store one or more databases. Server 704 may also include an input/output path 712. I/O path 712 may provide video conferencing data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714).

Memory may be an electronic storage device provided as storage 714 that is part of control circuitry 711.

Figure 8:
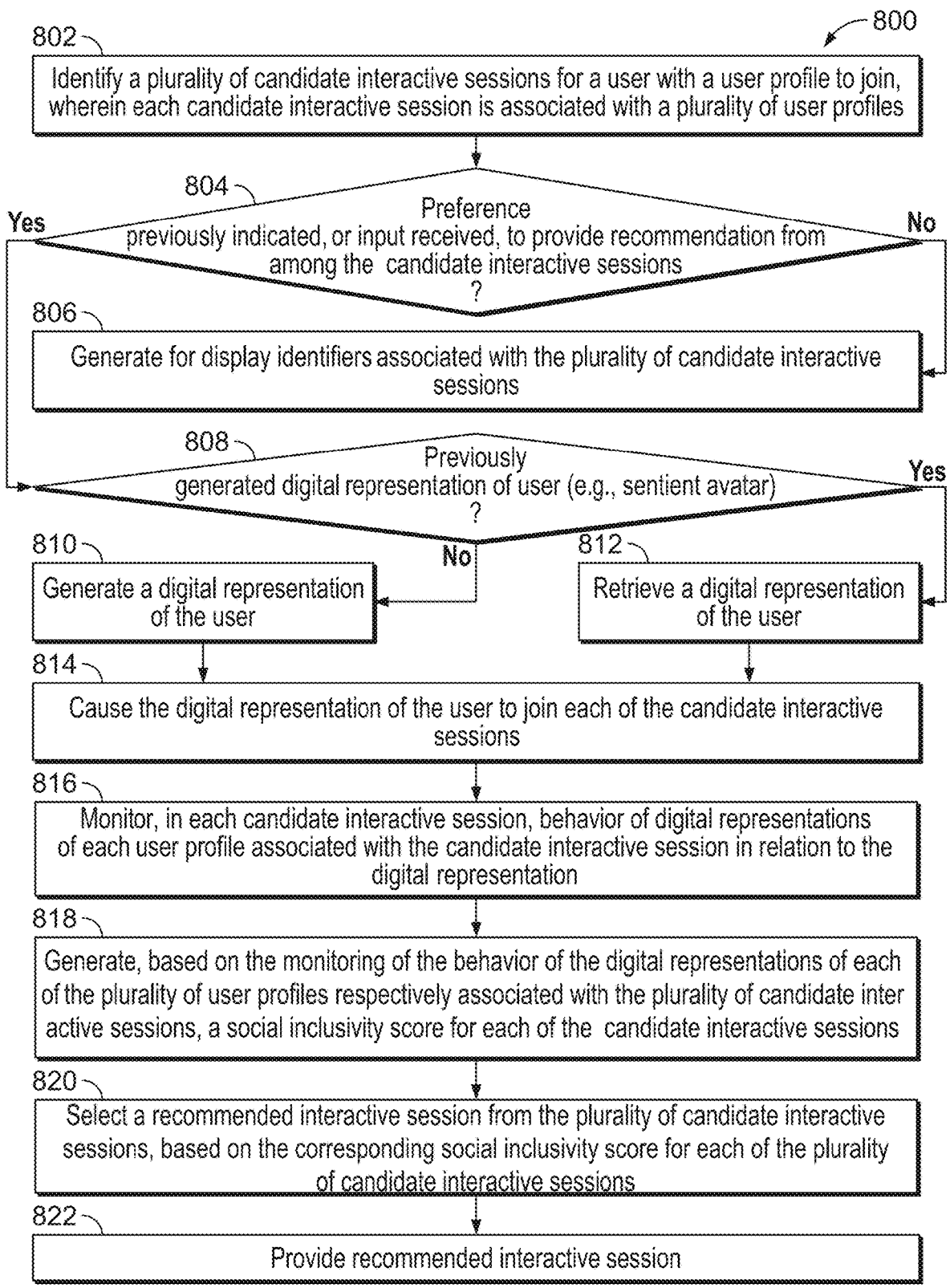
FIG. 8 is a flowchart of a detailed illustrative process for recommending an interactive session based on a social inclusivity score, in accordance with some embodiments of this disclosure.

FIG. 8 is a flowchart of a detailed illustrative process for recommending an interactive session based on a social inclusivity score, in accordance with some embodiments of this disclosure. In various embodiments, the individual steps of process 800 may be implemented by one or more components of the devices and systems of FIGS. 1-7 and may be performed in combination with any of the other processes and aspects described herein. Although the present disclosure may describe certain steps of process 800 (and of other processes described herein) as being implemented by certain components of the devices and systems of FIGS. 1-7, this is for purposes of illustration only. It should be understood that other components of the devices and systems of FIGS. 1-7 may implement those steps instead.

At 802, control circuitry (e.g., control circuitry 604 of FIG. 6 and/or control circuitry of FIG. 7) may identify a plurality of candidate interactive sessions for a user with a user profile to join, wherein each candidate interactive session is associated with a plurality of user profiles. For example, in the example of FIGS. 1A-1C, the control circuitry may identify interactive sessions 104 and 106 (e.g., video communication sessions) for User A to join, where interactive session 104 is associated with the user profiles of User B, User C, User D, and User E. As another example, in the example of FIGS. 4A-4B, the control circuitry may identify an interactive session (e.g., a virtual reality world) associated with XR environment 401 (associated with a user profile for avatar 404) and an interactive session associated with XR environment (associated with user profiles for avatars 406 and 408) for the user associated with avatars 402 and 404 to join. In some embodiments, the control circuitry may determine whether such interactive sessions are scheduled for the same time or at least partially overlap, prior to proceeding to 804.

At 804, the control circuitry may determine whether a preference has previously been indicated in the user's profile (e.g., User A of FIG. 1 or the user associated with avatars 402 and of FIGS. 4A-4B) or whether input is received from such user to provide a recommendation from among the plurality of identified candidate interactive sessions. The input may be received in any suitable form (e.g., via a touchscreen or other tactile input, a mouse click, a voice command, a biometric input, or any other suitable input or any combination thereof). For example, the user may specify a general preference that the SIMS is to be used to provide such recommendation for all interactive sessions the user is invited to or is permitted to access. As another example, the control circuitry may proceed to perform a recommendation only in association with specific interactive sessions associated with an explicit user request. As another example, the control circuitry may proceed to perform a recommendation, based on a user request or user preferences, in association with interactive sessions related to a certain topic, having certain other users invited, having one or more users that the user has no previous interaction history with, for only interactive sessions scheduled for the same time or overlapping, or based on any other suitable criteria, or any combination thereof. In some embodiments, the control circuitry may prompt the user regarding whether a recommendation should be made, e.g., whether sentient avatars should be utilized, such as if multiple overlapping interactive sessions are detected, or if a single interactive session is upcoming or available. If the control circuitry makes an affirmative determination at 804, processing may proceed to 808; otherwise processing may proceed to 806.

At 806, the control circuitry, having determined that the user is not interested in receiving a recommendation in relation to a particular candidate interactive session of the plurality of candidate interactive sessions, may generate for display identifiers associated with the plurality of candidate interactive sessions for user selection. The control circuitry may cause the user to join an interactive session associated with a received user input of an identifier of one of the plurality of interactive sessions.

At 808, the control circuitry, having determined that the user is interested in receiving a recommendation in relation to a particular candidate interactive session of the plurality of candidate interactive sessions, may determine whether a digital representation (e.g., a sentient avatar 211 or 213 of FIG. 2B or 2D, or a sentient avatar 402 or 404 of FIG. 4A or 4B) was previously generated for the user. If not, processing may proceed to 810 to generate one or more sentient avatars; otherwise processing may proceed to 812 where one or more sentient avatars may be retrieved from memory. In some embodiments, the control circuitry may generate or have previously generated a plurality of different sentient avatars, and may allow the user to select a particular sentient avatar to be caused to join a particular interactive session, or customize the appearance of a sentient avatar to be used for one or more interactive sessions. In some embodiments, the sentient avatar may have a different appearance than, and may be capable of performing fewer actions or movements than, an active avatar of the user.

At 814, the control circuitry may cause the digital representation of the user to join each of the candidate interactive sessions. In the example of FIG. 2B, the control circuitry may cause sentient avatar 211 to join interactive session 104, and in the example of FIG. 2D, the control circuitry may cause sentient avatar 213 to join interactive session 106. As another example, in FIG. 4A, the control circuitry may cause sentient avatar 402 to join XR environment 401, and in the example of FIG. 4B, may cause sentient avatar 404 to join XR environment 403. In some embodiments, the sentient avatars may simultaneously be sent to and/or may simultaneously be present in the plurality of candidate interactive sessions. In some embodiments, different instances of the same sentient avatar (e.g., having the same appearances and/or capabilities) may be sent to and present in multiple candidate interactive sessions. Alternatively, different sentient avatars (e.g., having different appearances and/or capabilities) may be sent to and present in multiple candidate interactive sessions.

At 816, the control circuitry may monitor, in each candidate interactive session, behavior of the digital representations of each user profile associated with the candidate interactive session in relation to the digital representation. For example, the control circuitry may monitor and analyze one or more of audio, body posture, body language, gestures or actions performed by the digital representations of each of the plurality of user profiles associated with the candidate interactive session in relation to the digital representation of the user, or analyze biometric signals (e.g., heart rate), or any other suitable technique may be employed, or any combination thereof. In some embodiments, similar monitoring and analysis of behaviors may be performed as described in association with Tables 1-4 above. In the example of FIG. 2B, the control circuitry may monitor the behavior of digital representations (e.g., active avatars) 212, and 216 of User B, User C and User D, respectively, in relation to sentient avatar 211 of User A, and in the example of FIG. 2D, the control circuitry may monitor the behavior of digital representations (e.g., active avatars) 232, 234 and 236 of User F, User G and User H, respectively, in relation to sentient avatar 213 of User A. In the example of FIG. 4A, the control circuitry may monitor the behavior of digital representations (e.g., active avatar) 404 and/or other digital representations of other avatars in relation to sentient avatar 402. In the example of FIG. 4B, the control circuitry may monitor the behavior of digital representations (e.g., active avatars) and 408 in relation to sentient avatar 404.

At 818, the control circuitry may generate, based on the monitoring at 816, a social inclusivity score for each of the plurality of candidate interactive sessions. For example, if the SIMS determines that certain behavior of other user profiles is a positive action in relation to User A, the social inclusivity score for the interactive session may be given a positive score or weight, e.g., incremented by +1, or any suitable value, which may be performed by using a counter. On the other hand, if the SIMS determines that certain behavior is a negative action in relation to User A, the social inclusivity score for the interactive session may be give a negative score or weight, e.g., decremented by any suitable value, e.g., −1, or any suitable value, which may be performed by using the counter.

In the example of FIG. 1B, the social inclusivity score of "−4" for interactive session as shown in FIG. 1A may be computed by summing the social inclusivity scores of User C ("−3"), User D (zero) and User E ("−1") associated with interactive session 104. In the example of FIG. 1C, the social inclusivity score of "3" for interactive session 106 as shown in FIG. 1A may be computed by summing the social inclusivity scores of User F (zero), User G (zero) and User H (3) associated with interactive session 106. In the example of FIGS. 4A-4B, avatar 404 ignoring sentient avatar 402 associated with the user may contribute to the associated interactive session having a negative social inclusivity score. In contrast, in the example of FIG. 4B, avatars 406 and 408's welcoming gestures and engagement with sentient avatar 404 may contribute to the associated interactive session having a positive social inclusivity score. In some embodiments, a suitability score may be determined (e.g., as shown in Table 4) and combined with the social inclusivity score when determining a candidate interactive session to recommend.

In some embodiments, the SIMS may generate a social inclusivity score based at least in part on historical interactions of a particular user (e.g., User A) with other users associated with (e.g., having their digital representation present in or otherwise invited to and/or expected to join) a particular interactive session. For example, the SIMS may identify how such users behaved towards the particular user in previous interactive sessions, which may inform the social inclusivity score for such users and/or for the interactive session associated with such users. In some embodiments, a social inclusivity score may be based at least in part on one or more topics associated with an interactive session, which may be determined based on analyzing a title, an agenda or metadata for such interactive session. In some embodiments, interactions outside of a video communication session or XR session, e.g., user ratings of a particular user, analyzing audio of telephone calls, analyzing text or images of email or other electronic communications between the users, analyzing a frequency of communications or a sentiment of communications with the users, or any other suitable criteria, or any combination thereof, may factor into the determined social inclusivity scores.

At 820, the control circuitry may select a recommended interactive session from the plurality of candidate interactive sessions, based on the corresponding social inclusivity score for each of the plurality of candidate interactive sessions. For example, the control circuitry may select a recommended interactive session from the plurality of candidate interactive sessions, based on the corresponding social inclusivity score for each of the plurality of candidate interactive sessions. As another example, the control circuitry may select a candidate interactive session having the highest overall social inclusivity score (e.g., based on the scores of each user associated with the interactive session and/or subject matter of the interactive session) or the candidate interactive session associated with a highest social inclusivity score for a particular user. In some embodiments, the control circuitry may set the social inclusivity score for a given interactive session to the average social inclusivity score for all users associated with the meeting in relation to the particular user.

In the example of FIGS. 1A-1C and 2A-2D, the control circuitry may select interactive session 106, based at least in part on interactive session 106 having a higher social inclusivity score than interactive session 104. In the example of FIGS. 4A-4B, the control circuitry may recommend to the user to join the interactive session shown at FIG. 4B, since this interactive session's participants were more receptive to Jimmy's sentient avatar as compared to the participant of FIG. 4A.

At 822, the control circuitry may provide the recommended interactive session to the user, e.g., automatically cause the user to join the interactive session without explicit user input, or in response to receiving selection of an identifier of the interactive session, e.g., via an interface associated with FIGS. 1A-1C or an interface associated with FIGS. 4A-4B. In some embodiments, providing the recommended interactive session to the user may comprise an active avatar of the user replacing the user's sentient avatar in the recommended interactive session. In some embodiments, providing the recommended interactive session to the user may cause all other sentient avatars to cease participating in candidate interactive sessions, or the other sentient avatars may continue participating in candidate interactive sessions until user input is received instructing the sentient avatars to cease participating in the interactive sessions.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
   identifying a plurality of candidate interactive sessions for a user with a user profile to join, wherein each candidate interactive session is associated with a plurality of user profiles;

generating a digital representation of the user, wherein the digital representation of the user comprises a sentient avatar;

causing the digital representation of the user to join each of the plurality of candidate interactive sessions;

monitoring, in each candidate interactive session, behavior of digital representations of each of the plurality of user profiles associated with the candidate interactive session in relation to the digital representation of the user;

generating, based on the monitoring of the behavior of the digital representations of each of the plurality of user profiles respectively associated with the plurality of candidate interactive sessions, a social inclusivity score for each of the plurality of candidate interactive sessions;

selecting a recommended interactive session from the plurality of candidate interactive sessions, based on the corresponding social inclusivity score for each of the plurality of candidate interactive sessions; and providing the recommended interactive session.

2. The method of claim 1, wherein each of the plurality of candidate interactive sessions corresponds to one of a plurality of video communication sessions or virtual meetings.

3. The method of claim 1, wherein each of the plurality of candidate interactive sessions corresponds to one of a plurality of virtual reality sessions, virtual reality meetings, or virtual reality games.

4. The method of claim 1, further comprising:
receiving input to join the user profile to the recommended interactive session; and
causing an active avatar of the user profile to be joined to the recommended interactive session.

5. The method of claim 1, wherein an appearance of the sentient avatar is different from an appearance of an active avatar of the user profile that is caused to be joined to the recommended interactive session.

6. The method of claim 5, wherein the sentient avatar has limited interactive capabilities in relation to the digital representations of each of the plurality of user profiles, as compared to the active avatar.

7. The method of claim 1, further comprising:
generating for display one or more social inclusivity scores for one or more of the plurality of user profiles associated with a particular candidate interactive session, based on the monitoring.

8. The method of claim 1, wherein the monitoring comprises:
monitoring one or more of audio, body posture, body language, gestures or actions performed by the digital representations of each of the plurality of user profiles associated with the candidate interactive session in relation to the digital representation of the user.

9. The method of claim 1, further comprising:
determining historical patterns of behavior of each of the plurality of user profiles in relation to the user profile during previous interactive sessions;
wherein providing the recommended interactive session is performed based at least in part on the determined historical patterns.

10. The method of claim 1, further comprising:
determining one or more characteristics of the user based on the user profile;
wherein providing the recommended interactive session is performed based at least in part on the determined one or more characteristics.

11. A system, comprising:
memory;
control circuitry configured to:
identify a plurality of candidate interactive sessions for a user with a user profile to join, wherein each candidate interactive session is associated with a plurality of user profiles, wherein the user profile is stored in the memory;
generate a digital representation of the user, wherein the digital representation of the user comprises a sentient avatar;
cause the digital representation of the user to join each of the plurality of candidate interactive sessions;
monitor, in each candidate interactive session, behavior of digital representations of each of the plurality of user profiles associated with the candidate interactive session in relation to the digital representation of the user;
generate, based on the monitoring of the behavior of the digital representations of each of the plurality of user profiles respectively associated with the plurality of candidate interactive sessions, a social inclusivity score for each of the plurality of candidate interactive sessions;
select a recommended interactive session from the plurality of candidate interactive sessions, based on the corresponding social inclusivity score for each of the plurality of candidate interactive sessions; and
provide the recommended interactive session.

12. The system of claim 11, wherein each of the plurality of candidate interactive sessions corresponds to one of a plurality of video communication sessions or virtual meetings.

13. The system of claim 11, wherein each of the plurality of candidate interactive sessions corresponds to one of a plurality of virtual reality sessions, virtual reality meetings, or virtual reality games.

14. The system of claim 11, wherein the control circuitry is further configured to:
receive input to join the user profile to the recommended interactive session; and
cause an active avatar of the user profile to be joined to the recommended interactive session.

15. The system of claim 11, wherein an appearance of the sentient avatar is different from an appearance of an active avatar of the user profile that is caused to be joined to the recommended interactive session.

16. The system of claim 15, wherein the sentient avatar has limited interactive capabilities in relation to the digital representations of each of the plurality of user profiles, as compared to the active avatar.

17. The system of claim 11, wherein the control circuitry is further configured to:
generate for display one or more social inclusivity scores for one or more of the plurality of user profiles associated with a particular candidate interactive session, based on the monitoring.

18. The system of claim 11, wherein the control circuitry is further configured to perform the monitoring by:
monitoring one or more of audio, body posture, body language, gestures or actions performed by the digital representations of each of the plurality of user profiles associated with the candidate interactive session in relation to the digital representation of the user.

* * * * *